US007027172B1

(12) United States Patent
Parulski et al.

(10) Patent No.: US 7,027,172 B1
(45) Date of Patent: Apr. 11, 2006

(54) COLOR DIGITAL PRINTER HAVING A GRAPHICAL USER INTERFACE FOR DISPLAYING AND SELECTING IMAGES FOR LOCAL AND REMOTE PRINTING

(75) Inventors: Kenneth A. Parulski, Rochester, NY (US); Nathan J. Romano, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 831 days.

(21) Appl. No.: 09/638,787

(22) Filed: Aug. 15, 2000

(51) Int. Cl.
*G06F 15/00* (2006.01)
*G11C 29/00* (2006.01)
(52) U.S. Cl. ..................... 358/1.15; 714/718
(58) Field of Classification Search .............. 358/1.15, 358/461, 518, 1.1, 540, 450, 521; 355/40, 355/27; 348/1.1, 403, 207.2, 372; 710/20, 710/21; 705/17, 18, 14, 9; 235/432, 436
See application file for complete search history.

(56) References Cited

U.S. PATENT DOCUMENTS

| 5,164,831 | A | | 11/1992 | Kuchta et al. |
| 5,477,264 | A | | 12/1995 | Sarbadhikari et al. |
| 5,930,810 | A | | 7/1999 | Farros et al. |
| 6,115,137 | A | | 9/2000 | Ozawa et al. |
| 6,151,652 | A | * | 11/2000 | Kondo et al. ............... 713/300 |
| 6,356,357 | B1 | * | 3/2002 | Anderson et al. .......... 358/1.17 |
| 6,431,448 | B1 | * | 8/2002 | Nelson et al. ......... 235/462.13 |
| 6,453,078 | B1 | * | 9/2002 | Bubie et al. ................ 382/305 |

2001/0019416 A1 * 9/2001 Monty et al. ................ 358/1.9

FOREIGN PATENT DOCUMENTS

| EP | 0 860 980 | 8/1998 |
| EP | 0 949 804 | 10/1999 |
| EP | 1 026 893 | 9/2000 |

OTHER PUBLICATIONS

International Electrotechnical Commission, IEC-61966-2-1: Multimedia Systems and Equipment; 1999.
Japan Electronic Industry Development Association; "Digital Still Camera Image File Format Standard"; JEIDA-49-1998.
CompactFlash Association; CF+ and CompactFlash Specification Revision 1.4; 1998-99.
Japan Electronic Industry Development Association; "Digital Still Camera Image File Format Standard"; JEIDA-49-1998.

* cited by examiner

*Primary Examiner*—Kimberly Williams
*Assistant Examiner*—Saeid Ebrahimi-DehKordy
(74) *Attorney, Agent, or Firm*—David A. Novais

(57) ABSTRACT

A digital printer is operationally associated with a digital storage medium interface and a graphic user interface to display and select images stored on the digital storage medium for local or remote printing. The graphical user interface includes user controls and an image display for displaying the images for printing. The graphical user interface enables a user to select, from, for example, a removable memory having images stored thereon, a subset of images to be printed. The graphical user interface is further adapted to permit communication via a network to a fulfillment center to enable remote printing and/or request photo products.

45 Claims, 14 Drawing Sheets

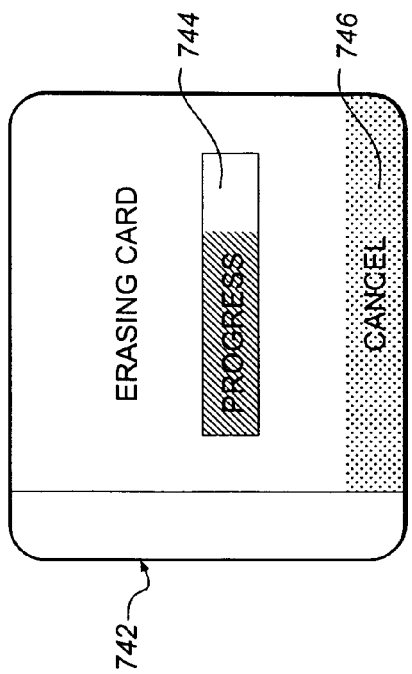
FIG. 6-O
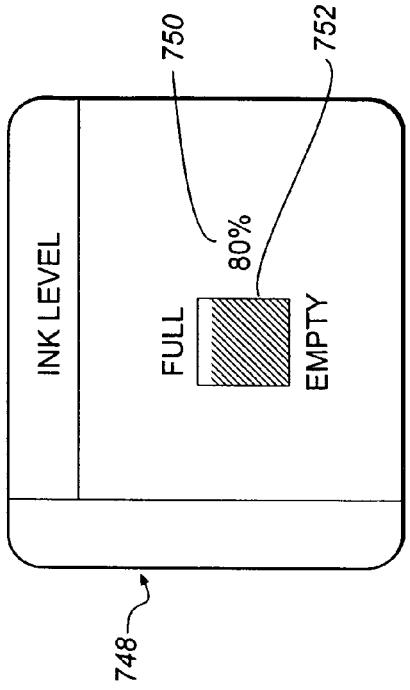
FIG. 6P
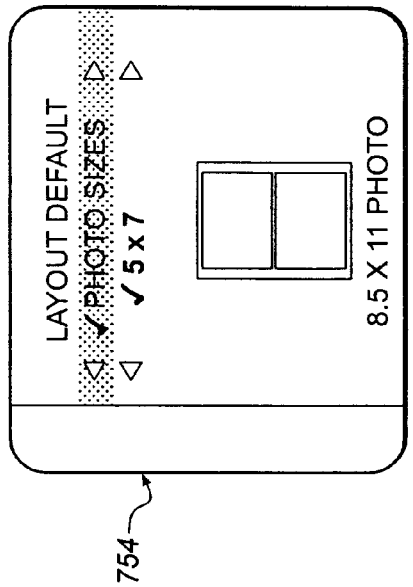
FIG. 6Q
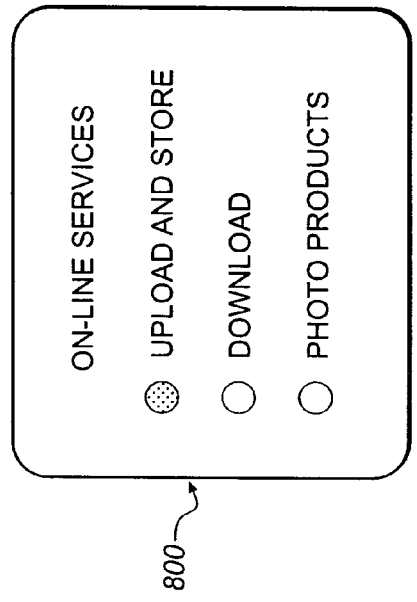
FIG. 6R

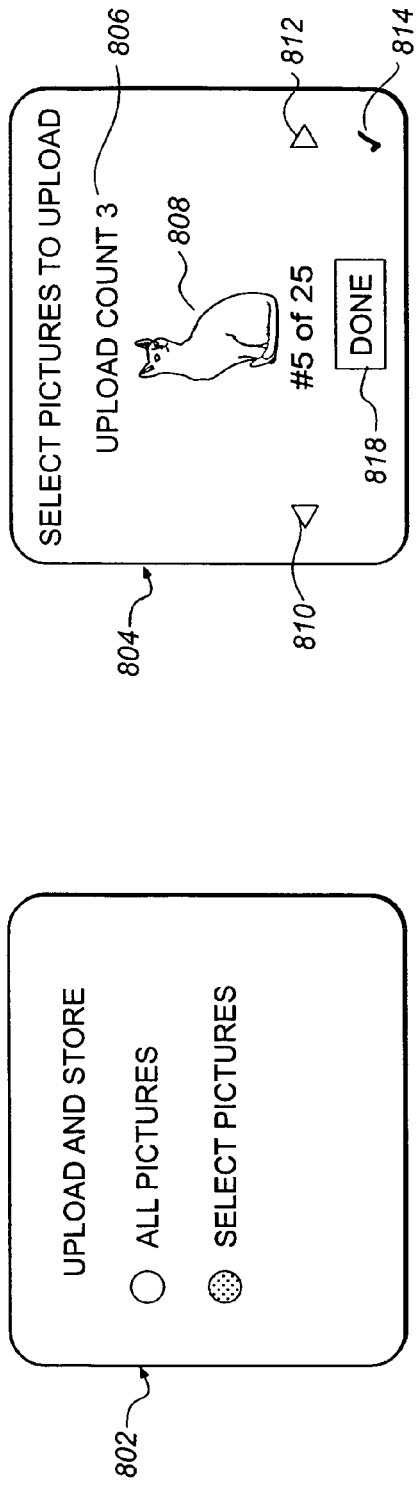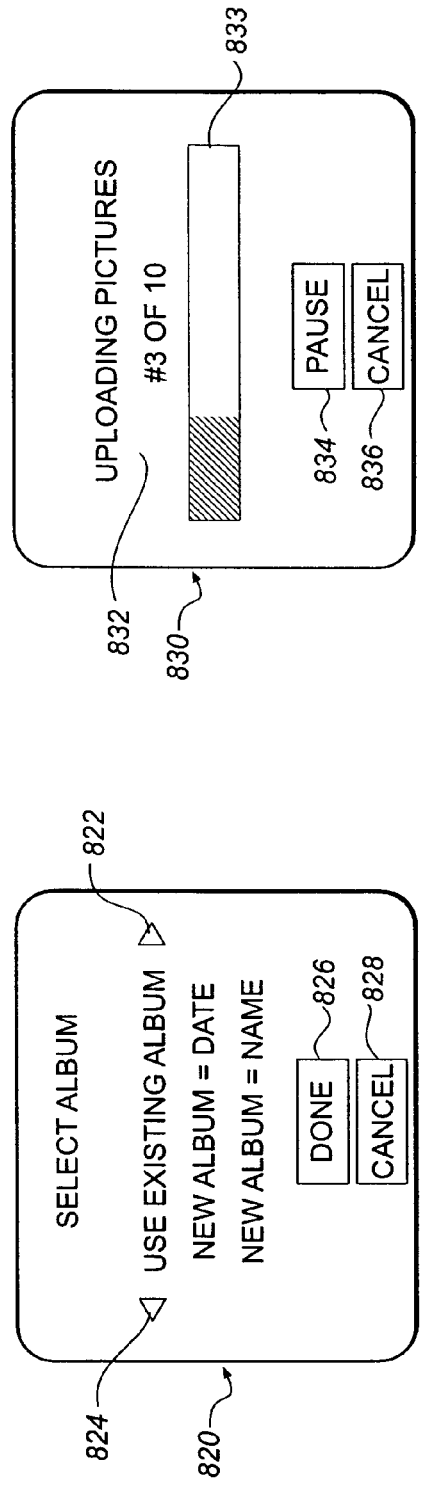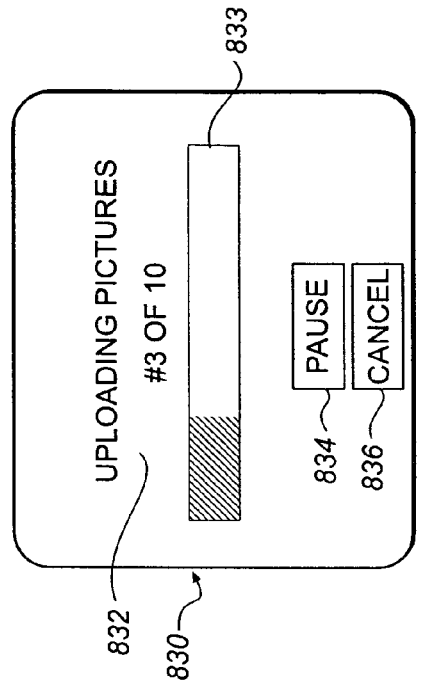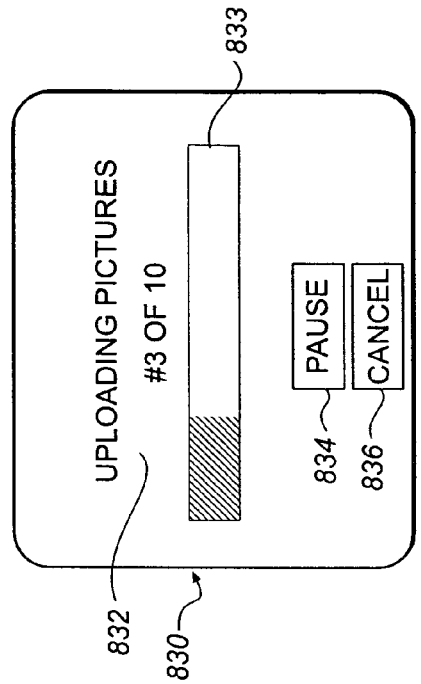

COLOR DIGITAL PRINTER HAVING A GRAPHICAL USER INTERFACE FOR DISPLAYING AND SELECTING IMAGES FOR LOCAL AND REMOTE PRINTING

CROSS REFERENCE TO RELATED APPLICATIONS

Reference is made to commonly-assigned U.S. patent application Ser. No. 09/534,469 filed Mar. 24, 2000, entitled CONFIGURING AND PURCHASING IMAGING DEVICES to Parulski; to U.S. patent application Ser. No. 09/576,288 filed May 23, 2000, entitled METHOD FOR PROVIDING CUSTOMIZED PHOTO PRODUCTS OVER A NETWORK to Parulski; and to Ser. No. 09/054,770 filed Apr. 3, 1998, and entitled SYSTEM AND METHOD FOR USING A SINGLE INTELLIGENCE CIRCUIT FOR A PLURALITY OF IMAGING RENDERING COMPONENTS which is a continuation-in-part of U.S. Ser. No. 08/956,989 filed Oct. 23, 1997 now U.S. Pat. No. 6,587,140; U.S. patent application Ser. No. 09/570,089 filed May 12, 2000, entitled A COLOR DIGITAL PRINTER HAVING A GRAPHICAL USER INTERFACE FOR DISPLAYING AND SELECTING IMAGES FROM A DIGITAL STORAGE MEDIUM to Romano, et al; and U.S. patent application Ser. No. 09/571,928 filed May 12, 2000, entitled A PRINTING SYSTEM AND METHOD HAVING A DIGITAL PRINTER THAT USES A DIGITAL CAMERA IMAGE DISPLAY to Parulski.

FIELD OF THE INVENTION

The present invention relates to a color digital printer or imaging apparatus and, more particularly, a digital printer including a graphic user interface for displaying and selecting images for local and remote printing.

BACKGROUND OF THE INVENTION

Digital cameras and digital printers are available from the Eastman Kodak Company and many other suppliers. Current digital cameras, such as the Kodak DC280 camera, capture images with a single-chip color CCD image sensor, process the images to provide "finished" RGB images, compress the images using JPEG compression, and store the images on a removable memory card. The images can be reviewed on a LCD image display on the back of the camera, and unwanted images can be deleted.

The memory card can then be placed in a desktop digital color printer, such as the Kodak Personal Picture Maker PM100. This printer includes memory card slots for the well-known Compact Flash and Smart Media Flash EPROM memory cards. The card is removed from the camera and placed in the printer. The printer includes a monochrome LCD status display and several buttons that serve as the user interface. These buttons enable the user to make one or more copies of all of the images on the memory card and to select various printer features. The prints are made using a color ink jet head which marks specially designed photo ink jet paper.

However, for some especially memorable pictures, the user may want to obtain enlargements, photo mugs, or other types of photo products. These desired photo products might be larger than can be provided by their desktop printer, could use another type of output media (e.g. silver halide photographic paper) or could be some type of personalized product (e.g. a t-shirt or coffee mug having a selected picture). In this case, the user needs to bring their digital images to a retail outlet providing these services, or transfer their images to a computer connected to the Internet, in order to order their desired photo products, using for example the method described in commonly assigned U.S. patent application Ser. No. 09/576,288.

In addition, the user might want to store favorite images in digital format for viewing by others, or to allow for future reprinting. Unfortunately, the cost of the Flash EPROM memory cards used in many digital cameras makes this an unattractive storage option. In the prior art, after printing in a device such as the PM100 printer described earlier, favorite images are transferred from the camera to a separate storage device on the user's computer (e.g. a computer hard drive) and the memory card is erased and re-used. Transferring images to a computer, after printing the images on a separate, stand-along printer, requires a second, time-consuming step.

In the prior art, therefore, the user must perform separate, lengthy operations in order to obtain various types of prints and other photo products from the group of digital images taken with their digital camera, or in order to obtain both prints and a separate digital file for future use. What is needed is a printer having a simple, graphical user interface that enables the user to quickly and easily select a set of the images to be print locally, as well as one or more images to be printed on a separate, remote printer offering capabilities not available on the local printer, and to easily store the digital image files for future use.

SUMMARY OF THE INVENTION

An object of the present invention is to provide for a printer which permits an individual to selectively print images locally via the printer or remotely via a network.

The present invention relates to a digital printer for producing hardcopy prints. The printer comprises a marking apparatus adapted to provide images on a print; a digital medium interface for transferring images from a digital storage medium which stores a plurality of digital images; a network connection for communicating with a network; and a graphical user interface having user controls. The graphical user interface is adapted to select a digital image stored on the digital storage medium and selectively communicate with both the marking apparatus for local printing of the selected image, and the network for remote printing of the selected image.

The present invention further relates to an imaging apparatus adapted to produce hardcopy prints. The apparatus comprises an interface arrangement adapted to transfer images stored on a digital storage media, with the transferred images being viewable on a display screen of the imaging apparatus; a communication arrangement for transferring images to a network; and user controls adapted to select local or remote network printing of the images stored on the digital storage media.

The present invention further relates to a method of producing prints. The method comprises the steps of electronically capturing images by way of an electronic camera; transferring the captured images to a printer; displaying the captured images on a display screen on the printer; selecting a specific image to be printed from the captured images; and uploading the selected image to a network for remote printing.

The present invention further relates to method of producing prints which comprises the steps of: capturing images by way of an image capture mechanism; converting the images to digital images; transferring the digital images to a printer; displaying the images on a display screen on the printer; selecting a specific image to be printed from the images; and transferring the selected image via a network to a fulfillment service for remote printing.

BRIEF DESCRIPTION OF THE DRAWINGS

FIGS. 7A to 7D depict graphical user interface screens used to upload images from the digital printer for storage;

DETAILED DESCRIPTION OF THE INVENTION

Figure 1:
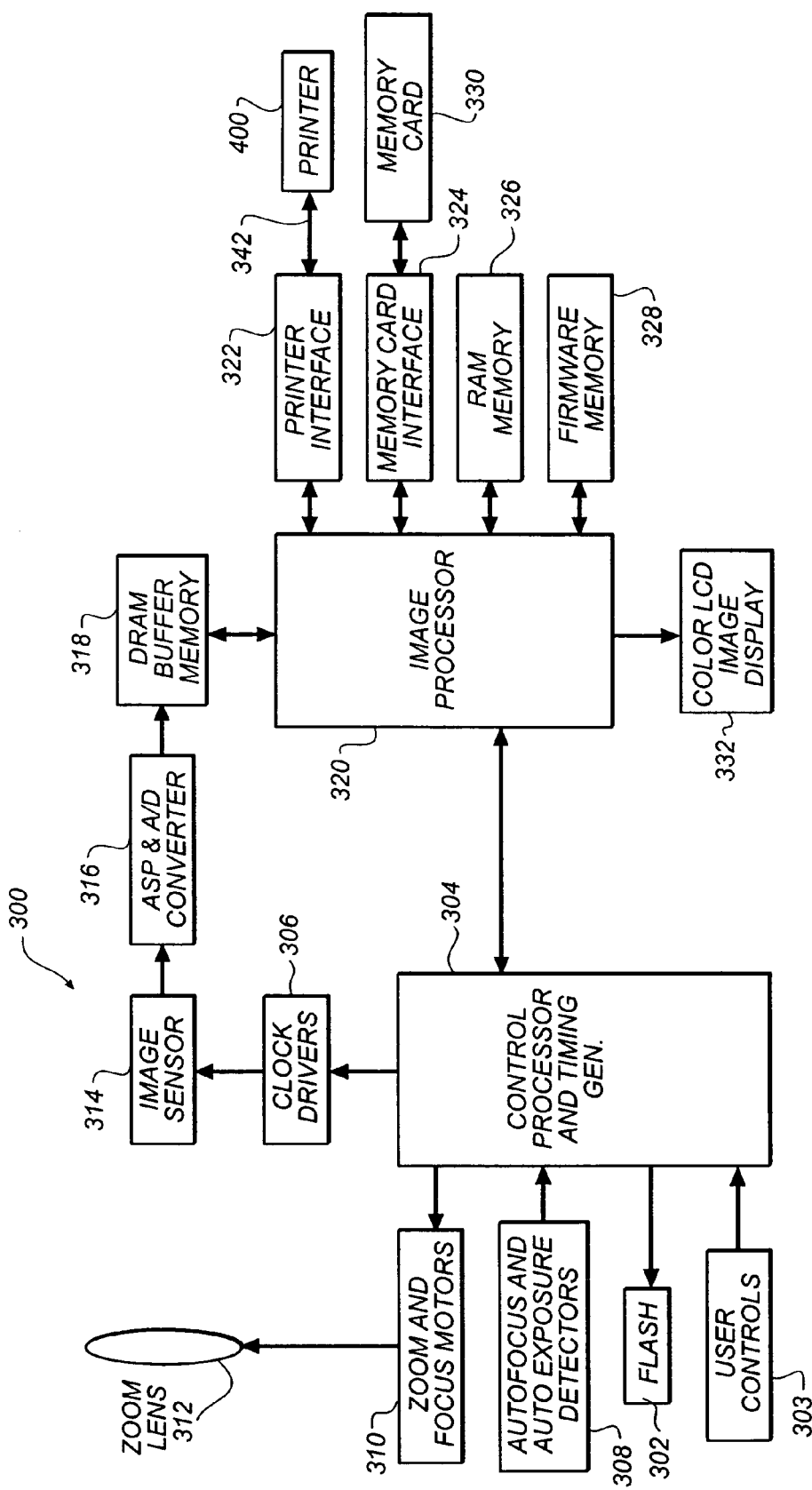
FIG. 1 depicts a block diagram of a digital camera that captures and stores images on a digital storage media.
Figure 2:
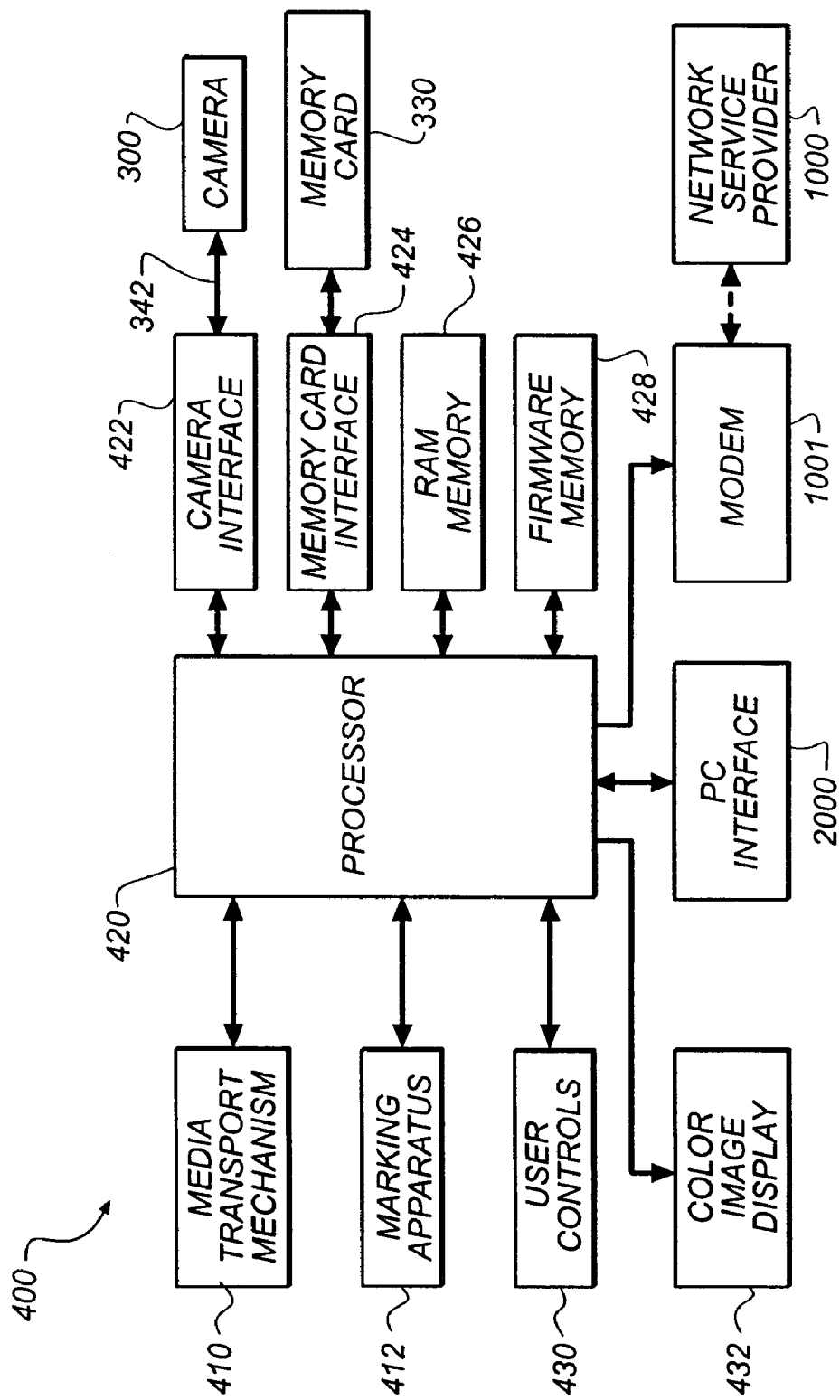
FIG. 2 depicts a block diagram of a digital printer connected to a network, and having a graphical user interface for displaying and selecting images for printing both locally and via the network.
Figure 3A:
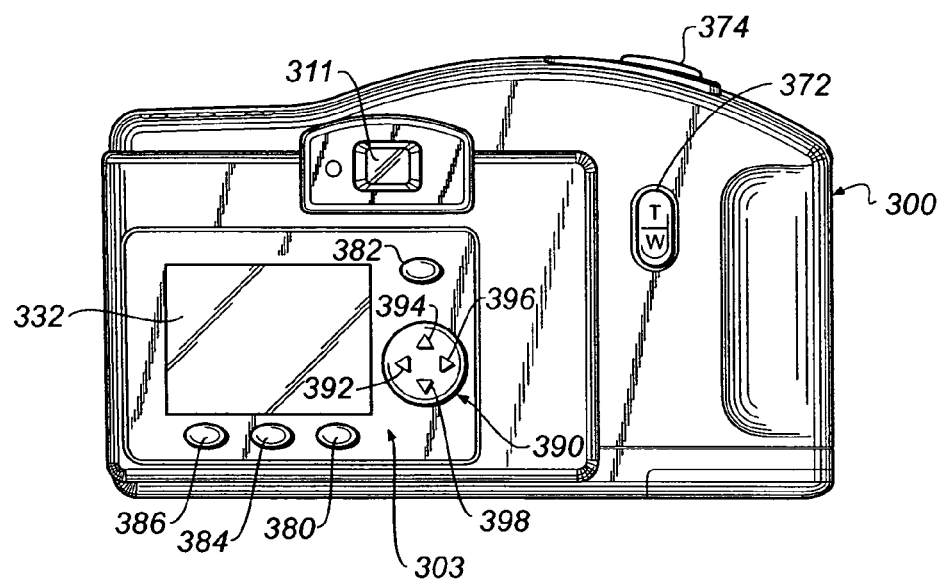
FIG. 3A depicts the rear view of an electronic camera.

Referring now to the drawings, wherein like reference numerals represent identical or corresponding parts throughout the several views, a digital camera 300 is depicted in FIGS. 1 and 3A. Digital camera 300 stores images on a digital storage medium, such as a memory card 330 as shown in FIG. 1. A digital printer or imaging apparatus 400, shown in detail in FIGS. 2 and 3B, produces color hardcopy prints using a color marking apparatus 412, such as an ink jet head, and a paper transport mechanism 410. Digital printer 400 includes a digital media interface, such as a memory card interface 424 (FIG. 2.), for transferring images from memory card 330. As illustrated in FIG. 2, digital printer 400 incorporates a graphical user interface including a color image display 432 for displaying the digital images stored on memory card 330 and user controls 430 for selecting specific images to be printed from the plurality of digital images stored on memory card 330.

Referring now to FIG. 1 in detail, FIG. 1 is a block diagram showing electronic camera 300 that captures and stores digital images on a digital storage medium, such as memory card 330. FIG. 3A depicts a rear view of the appearance of electronic camera 300. Electronic camera 300 includes a zoom lens 312 having zoom and focus motor drives 310 and an adjustable aperture and shutter (not shown). The user composes the image using optical viewfinder 311 and zoom lens control switch 372 shown in FIG. 3A. Zoom lens 312 focuses light from a scene (not shown) on an image sensor 314, for example, a single-chip color CCD image sensor, using the well-known Bayer color filter pattern. Image sensor 314 is controlled by clock drivers 306. Zoom and focus motors 310 and clock drivers 306 are controlled by control signals supplied by a control processor and timing generator circuit 304. When the user depresses shutter button 374 (FIG. 3A) to take a picture, control processor and timing generator 304 receives inputs from autofocus and autoexposure detectors 308 and controls a flash 302. The analog output signal from image sensor 314 is amplified and converted to digital data by analog signal processing (ASP) and analog-to-digital (A/D) converter circuit 316. The digital data is stored in a DRAM buffer memory 318 and subsequently processed by a camera processor 320 controlled by the firmware stored in a firmware memory 328, which can be flash EPROM memory.

The processed digital image file is provided to a camera memory card interface 324 which stores the digital image file on memory card 330. Removable memory cards 330 which are described as an example in the present specification are known to those skilled in the art, and are one type of digital storage media. The memory card 330 can conform to the Compact Flash interface standard, such as described in the *CompactFlash Specification Version* 1.3, published by the CompactFlash Association, Palo Alto, Calif., Aug. 5, 1998. The removable memory card can alternately conform to the PCMCIA, Smart Media, Memory Stick, or SD memory card formats. The present invention is not limited to memory cards and it is noted that other types of digital storage media, such as magnetic hard drives, magnetic tape, or optical disks, can alternatively be used to store the digital images.

Processor 320 performs color interpolation followed by color and tone correction, in order to produce rendered sRGB image data as defined in IEC 61966-2-1 *Multimedia systems and equipment—Colour measurement and management—Part 2–1: Colour management—Default RGB colour space—sRGB* available from the International Electrotechnical Commission, Geneva, Switzerland. The rendered sRGB image data is then JPEG compressed and stored as a JPEG image file on memory card 330 using an JPEG/Exif version 2.1 image file as defined in *Digital Still Camera Image File Format Standard* (*Exchangeable Image File Format for Digital Still Camera: Exif*), version 2.1, JEIDA-49-1998 available from the Japan Electronic Industry Development Association, Tokyo, Japan. The JPEG/Exif image files can be utilized by many different image capable devices, such as computers and stand-alone printers.

Processor 320 also creates a "thumbnails" size image, as described in commonly assigned U.S. Pat. No. 5,164,831 "Electronic still camera providing multi-format storage of full and reduced resolution images" to Kuchta et al. The thumbnail image is stored in RAM memory 326 and supplied to a color LCD image display 332, which displays the captured image for the user to review. User controls 303 and the text, icons, and images displayed on the display 332 provide the camera graphical user interface (camera GUI). As shown in FIG. 3A, the user controls 303 include menu button 380, select button 382, capture mode button 384, review mode button 386, and cursor button 390 having left arrow button 392, up arrow button 394, right arrow button 396, and down arrow button 398. After a series of images has been taken after depressing capture mode button 384, and then repeatedly depressing shutter button 374, review mode button 386 may be pressed so that the captured images can be reviewed on color LCD image display 332.

The camera grapical user interface is controlled by the user interface portion of the firmware stored in firmware memory 328, which controls how the processor 320 responds to user controls 303 and creates the information displayed on display 332. Display 332 can be an active matrix color LCD display. Alternately, it can use other display technologies, such as organic light emitting diodes (OLEDs). Electronic camera 300 can also include a video output driver and connector (not shown) for displaying the captured images on a TV (not shown). Camera 300 may include firmware stored in firmware memory 328 to control image processor 320 to allow the user to create an image utilization file (such as a Digital Print Order Format (DPOF) file) to indicate what images are to be printed. Such a utilization file is described in commonly-assigned U.S. patent application Ser. No. 08/977,382, filed Nov. 24, 1997 to Parulski. This image utilization file is stored on memory card 330 along with the image files.

After a series of images have been taken and stored on memory card 330, memory card 330 can be inserted into a printer memory card interface 424 in digital printer 400 as shown in FIG. 2. Alternatively, a printer interface 322 in electronic camera 300 can be used to connect to a corresponding camera interface 422 in printer 400. Connection 342 between electronic camera 300 and digital printer 400 may be, for example, an interface cable conforming to the well-know universal serial bus (USB) interface specification, the IEEE 1394 interface specification, or other cable interface specifications. Alternately, the interface may utilize a wireless interface such as the well-known IrDA (Infrared Data Association) interface or an RF (radio frequency) interface such as the well-known Bluetooth RF interface. Alternately, electronic camera 300 may include an electrical connector that directly mates with a corresponding connector on digital printer 400.

Figure 3B:
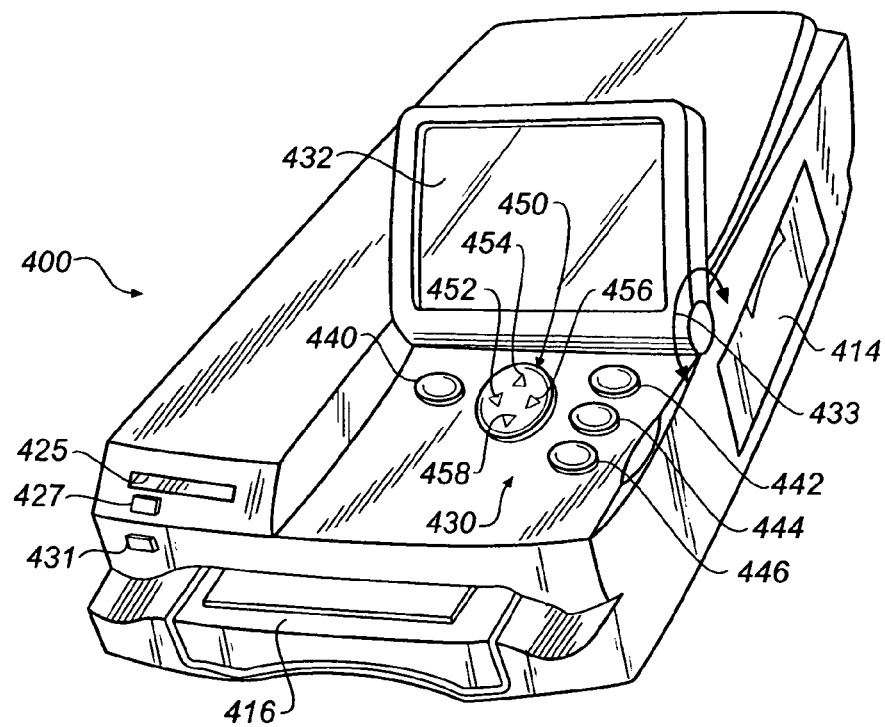
FIG. 3B depicts a perspective view of a digital printer.

FIG. 2 is a block diagram of digital printer 400. FIG. 3B depicts the appearance of digital printer 400. Digital printer 400 produces digital prints (not shown) from images provided on memory card 330 or via camera interface 422 from electronic camera 300. Digital printer 400 includes a media transport mechanism 410, such as a motor-driven roller, for moving hard copy media (e.g., ink jet paper) past marking apparatus 412 (e.g., a color ink jet head) under the control of a printer processor 420. Processor 420 controls the marking apparatus 412 to provide controlled amounts of various color inks or dyes in order to produce a pictorial image on the hardcopy media. Color marking apparatus 412 may alternately use color thermal dye sublimation, color electrophotographic, or color instant technologies to produce the digital prints. As shown in FIG. 3B, digital printer 400 includes a paper exit slot 416 where the print can be ejected from digital printer 400, and an access door 414 which can be opened to replace the inks or dyes (e.g. to replace the color ink jet cartridge). Printer 400 also includes a slot 425 for inserting memory card 330 into memory card interface 424, and an ejector button 427 for removing memory card 330 from printer 400. Printer 400 also includes a power switch 431 for turning on and off power to printer 400 provided by a power cord input (not shown).

As described earlier in relation to FIG. 1, memory card 330 can conform to the Compact Flash interface standard, such as described in the *CompactFlash Specification Version 1.3*, published by the CompactFlash Association, Palo Alto, Calif., Aug. 5, 1998. The removable memory card 330 can alternately conform to the PCMCIA, Smart Media, Memory Stick, or SD memory card formats. Other types of digital storage media, such as magnetic hard drives, magnetic tape, or optical disks, can alternatively be used to store the digital images.

Digital printer 400 further includes a color image display 432 that pivots from a closed protected position to a viewable position, as shown by arrow 433 (FIG. 3B). Color image display 432 can be an active matrix color LCD display. Alternately, it can use other display technologies, such as organic light emitting diodes (OLEDs). Digital printer 400 is controlled by printer user controls 430. User controls 430 and the text, icons, and images displayed on color image display 432 provide the printer graphical user interface (printer GUI). User controls 430 include menu button 440, select button 442, view/return button 444, print button 446 and cursor button 450 having left arrow button 452, up arrow button 454, right arrow button 456, and down arrow button 458. The printer GUI is controlled by the user interface portion of the firmware stored in firmware memory 428, which controls how processor 420 responds to user controls 430 and creates the information displayed on color image display 432. Digital printer 400 can also include a video output driver and connector (not shown) for displaying the images on a TV (not shown).

Since the image files created by electronic camera 300 use the JPEG/Exif image format, they are JPEG compressed and must be decompressed by processor 420 in digital printer 400. Processor 420 also provides interpolation, sharpening, color correction, and half-toning to prepare the image data properly to be used by marking apparatus 412. Processor 420 is controlled by firmware stored in firmware memory 428.

To quickly allow the images stored on memory card 330 to be displayed on color image display 432, processor 420 downloads the "thumbnail" size images from the images provided on memory card 330. These thumbnail images are stored in RAM memory 426 and supplied to display 432, so that the user can select the images to be printed using user controls 430. Images can be electronically transferred from printer 400 to a remote service provider by way of network service provider 1000 and modem 1001, as will now be described in reference to FIG. 4.

Figure 4:
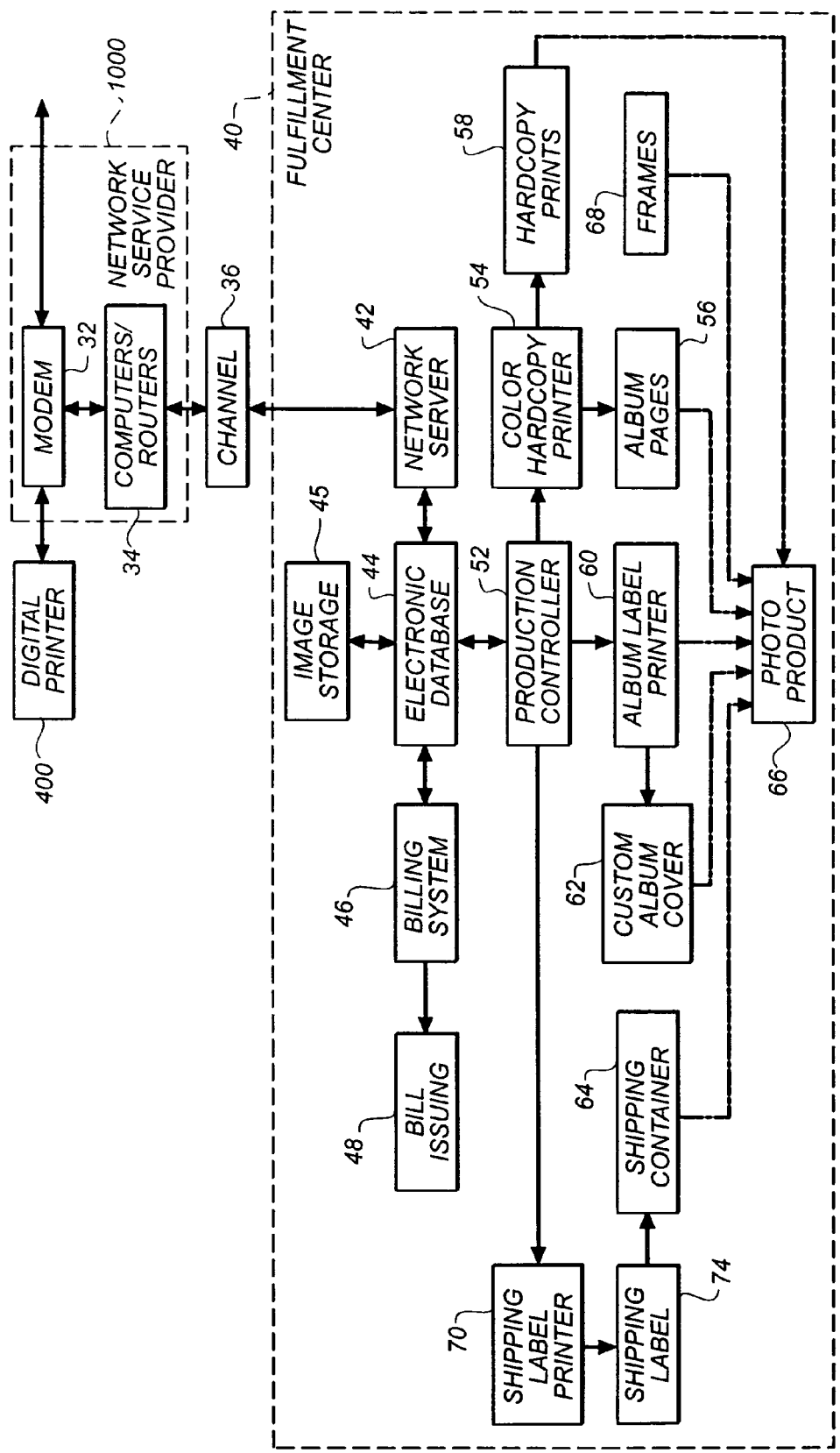
FIG. 4 depicts the depicts a block diagram of a system that connects to the printer of FIG. 2 to store images and produce photo products.

FIG. 4 is a block diagram of a system that connects to printer 400, in order to upload images for storage and viewing by others, and to produce photo products 66 that printer 400 is not capable of providing. The system depicted in FIG. 4 can also download previously uploaded and stored images to printer 400 for reprinting. As shown in FIG. 2, printer 400 includes a modem 1001 which connects to a network service provider 1000. The network service provider 1000, such as an internet service provider (ISP), communicates with modem 1001 to provide a network connection for printer 400 to a channel 36, such as the Internet. The system further includes a fulfillment center 40 which communicates with printer 400 via channel 36 and the ISP 1000 to perform the steps of uploading images from printer 400 in order to store images in image storage 45, or to provide and ship photo products 66. As an example, a photofinisher or retail minilab which provides photofinishing services such as photographic prints, picture CD, etc. can make up part of fulfillment center 40.

The various portions of fulfillment center 40 can be located in a single building or complex of adjacent buildings, or can be geographically disbursed over several sites in different cities or even different continents. For example, an electronic database 44, image storage 45, and an album production controller 52 can be provided by computers located in different cities and interconnected via a suitable digital communications network, such as the Internet. Furthermore, electronic database 44, image storage 45, or album production controller 52 can themselves be distributed over several computers in several different locations.

ISP 1000, for example, Earthlink Network, Inc. of Pasadena, Calif., includes banks of modems 32, one of which is connected to communicate with modem 1001 of printer 400. Modem 32 in turn communicates with computers/routers 34 in order to provide a connection to channel 36 using equipment and techniques well known to those skilled in the art.

Fulfillment center 40 is connected to channel 36, such as the Internet, by network server 42, such as an Internet server, which is comprised of one or more computers and associated peripherals. Electronic database 44 provides information related to numerous photo product options, such as printing a group of uploaded digital images onto double-sided album pages, or producing a coffee mug or t-shirt.

When the user purchases or rents digital printer 1000, the retail or on-line store establishes an account for the user, which includes billing information, such as a bank account number or payment identifier (e.g., credit card or debit card number) to be debited for any purchases. The account also includes a mailing address for the user, and may also contain mailing addresses for one or more user designees (e.g. family or friends). The user account number is stored in firmware memory 428 of digital printer 400. The account information is stored in electronic database 44 of fulfillment center 40. When a photo product 66 is purchased, electronic database 44 communicates with a billing system 46 to verify that the account number for the customer is still valid, and issues a bill. The customer's account that is debited can, of course, be located at a remote financial institution. Typically, as with credit cards, this financial institution will make payment to the direct provider or seller of photo product 66. This is generally done by wiring the amount into the direct provider's account, generally an account established with another financial institution.

As shown in FIG. 4, electronic database 44 is connected to image storage 45 and to production controller 52. Image storage 45, which may be provided by banks of hard drives, optical discs, or any other form of digital data storage device, is used to store images uploaded from digital printer 400. The images stored on image storage 45 may be later viewed on color image display 432 when images are downloaded. This is done by first downloading thumbnail images from image storage 45 to RAM memory 426 in digital printer 400. The user selects the images to be downloaded from these thumbnails. The selected images are then downloaded over channel 36 and stored on memory card 330. Alternatively, the selected images could be stored using an internal (non-removable) printer memory, such as RAM memory 426, an internal printer FLASH EPROM image memory, internal magnetic hard drive, or another type of data storage device.

The image storage 45 can be accessed by network server 42 in order to allow the user's images stored in image storage 45 to be directly accessed by others on-line via the Internet using a standard Internet browser. Such an arrangement can allow the user's family and friends to view images uploaded by the user.

Production controller 52 controls one or more color hardcopy printers 54 that can produce album pages 56 or separate hardcopy prints 58. The hardcopy prints can be placed in frames 68. Production controller 52 is also connected to an album label printer 60 which produces labels that can be attached to a standard album cover to provide custom album cover 62.

Production controller 52 also controls a shipping label printer 70 to produce a shipping label 74. Shipping label 74 is attached to a shipping container 64 (e.g., a cardboard box containing packing material) that contains and protects photo product 66 during shipment (e.g., via air express mail, ground carrier, etc.) to the customer or the customer's designee.

Figure 5:
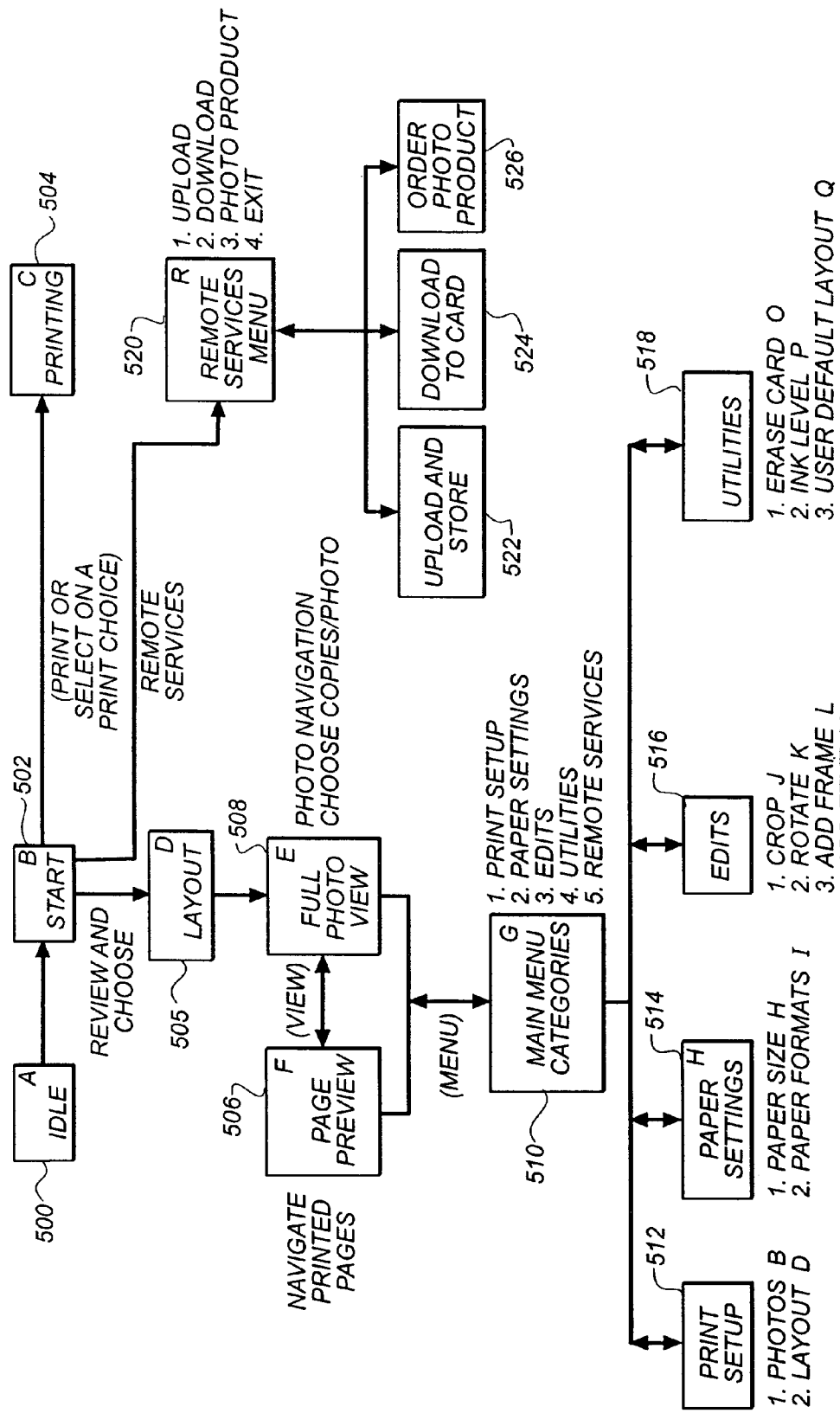
FIG. 5 depicts a flow diagram of a typical user interaction scenario.

FIG. 5 depicts the general workflow that a user may follow in order to locally print images and to upload images for storage or to produce photo products, or to download images that were previously uploaded. The workflow includes numerous printer modes 500–526 which utilize various printer GUI screens shown in FIG. 6A–FIG. 6R, FIG. 7A–FIG. 7D, FIG. 8A–FIG. 8D, and FIG. 9A–FIG. 9D, which are displayed on image display screen 432 of digital printer 400. The modes include an Idle mode 500 that uses the printer GUI screen shown in FIG. 6A, a Start mode 502 that uses the printer GUI screen shown in FIG. 6B, a Printing in Process mode 504 that uses the printer GUI screen shown in FIG. 6C, and a Layout mode 505 that uses the printer GUI screen shown in FIG. 6D. The modes also include a Full Photo View mode 508 that uses the printer GUI screen shown in FIG. 6E, a Page Preview mode 506 that uses the printer GUI screen shown in FIG. 6F, and a Main Menu Categories mode 510 that uses the printer GUI screen shown in FIG. 6G. The modes also include Print Setup modes 512, including a Photos submode that uses the printer GUI screen shown in FIG. 6B and a Layout submode that uses the printer GUI screen shown in FIG. 6D. The modes also include Paper Settings modes 514, including a Paper Size submode that uses the printer GUI screen shown in FIG. 6H and a Paper Format submode that uses the printer GUI screen shown in FIG. 6I. The modes also include Edits modes 516, including a Crop submode that uses the printer GUI screen shown in FIG. 6J, a Rotate submode that uses the printer GUI screen shown in FIG. 6K, an Add Frame submode that uses the printer GUI screen shown in FIG. 6L and L', an add Text submode that uses the printer GUI screens shown in FIG. 6M and M', and a Change brightness submode that uses the printer GUI screen shown in FIG. 6N. The modes also include Utilities modes 518, including an Erase card submode that uses the printer GUI screen shown in FIGS. 6–0, an Ink Level submode that uses the printer GUI screen shown in FIG. 6P, and a User Default Layout submode that uses the printer GUI screen shown in FIG. 6Q.

The modes also include a Remote Services Menu mode 520 that uses the printer GUI screen shown in FIG. 6R, an Upload and store mode 522 that uses the printer GUI screens shown in FIGS. 7A–7D, a Download to Card mode 524 that uses the printer GUI screens shown in FIGS. 8A–8D, and an Order Photo Products mode 526 that uses the printer GUI screens shown in FIGS. 9A–9D.

Menu button 440 as shown in FIG. 3B toggles to and from Main Menu Categories mode 510 from the Page Preview mode 506 or the Full Photo View mode 508. Select button 442 is used in Full Photo View mode 508 to toggle images to be printed on and off in order to select specific images to be printed. In Menu modes 510, 512, 514, 516, 518, 520, 522, 524 and 526, select button 442 allows the user to enter a submenu or accept menu settings. View/return button 444 is used to switch modes between Page Preview mode 506 and Full Photo View mode 508. In Menu modes 510, 512, 514, 516 and 518, View/return button 444 allows the user to return to a previous menu level without retaining any changed settings.

Print button 446 initiates the print procedure. If there is no memory card 330 attached to memory card interface 424, or no camera 300 connected to camera interface 422, pressing print button 446 initiates a test print. If there is a memory card 330 in printer 400, depressing print button 446 initiates the print using the current printer settings.

Figure 6B:
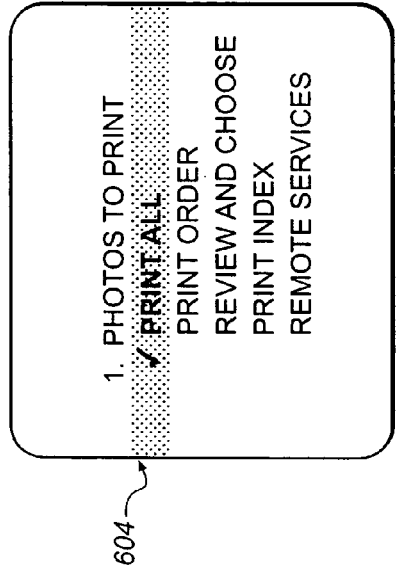
FIGS. 6A to 6L, 6L', 6M, 6M' and 6N–6R depict graphical user interface screens used as part of the printer graphical user interface.
Figure 6D:
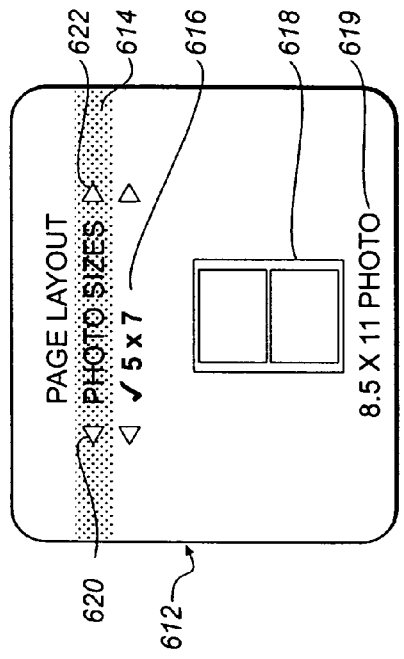
Figure 6A:
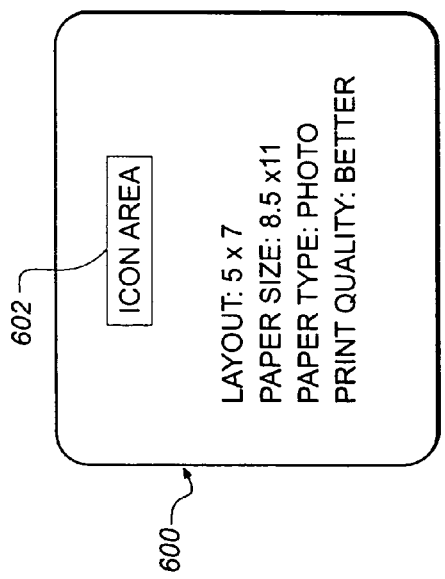
Figure 6C:
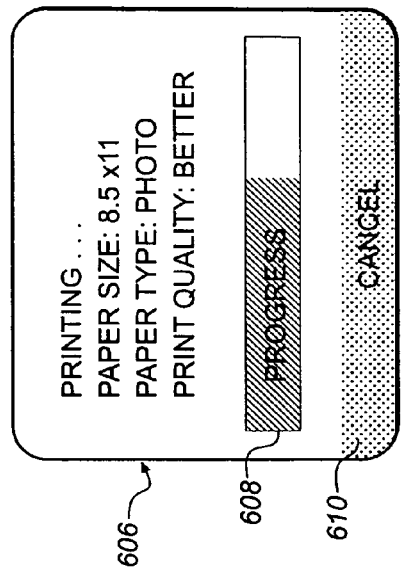
Figure 6E:
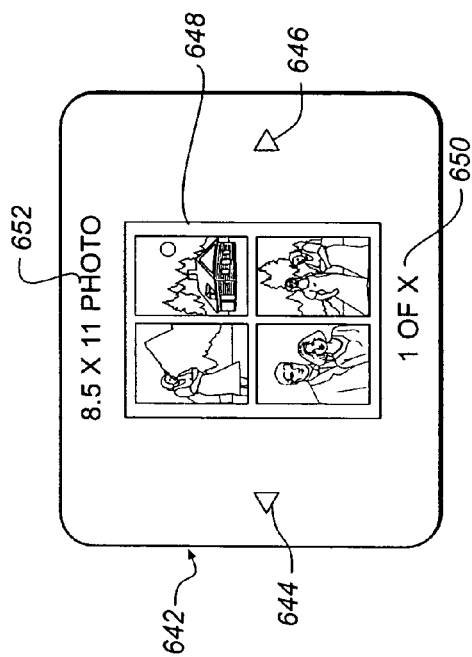

In Full Photo View mode 508 corresponding to the display screen shown in FIG. 6E, cursor left arrow 452 and cursor right arrow 456 allow the user to navigate photos, and cursor up arrow 454 and down arrow 458 allow the user to select the number of copies per image. In Page Preview mode 506 corresponding to the display screen in FIG. 6F, cursor left arrow 452 and cursor right arrow 456 allows the user to navigate the pages. In Menu modes 510, 512, 514, 516 and 518, the cursor buttons 450 are used for menu navigation.

Turning now to FIG. 6A, idle screen 600 is used to provide pertinent information on the current printer parameter settings. These parameters include the layout, paper size, paper type, and print quality. The user-defined default setting (to be described later in relation to FIG. 6Q) is used, unless the user overrides this default setting by making other selections. Idle screen 600 allows the user to immediately understand the settings that will be used if the user immediately presses print button 446 in FIG. 3B. This is beneficial because the user may not have used the printer for some time, and may have forgotten the printer parameter settings. If the settings are appropriate, the user may insert removable memory card 330 and immediately make prints without further interactions with the printer GUI. The idle screen also displays an icon 602 representing the printer, to provide immediate identification that this is not a parameter setting screen such as the parameter settings screens depicted in FIGS. 6B–6N.

FIG. 6B depicts the Start GUI screen 604, which is displayed on color image LCD 432 when the user inserts memory card 330 into the memory card interface 424. GUI screen 604 provides a simple method for locally printing either all of the images stored on memory card 330 using the "Print All" option or printing the images specified in an image utilization file stored along with the images on memory card 330 using the "Print Order" option. The user can also use the "Print Index" option to make an index print including small versions of all of the images stored on memory card 330. In all three cases, processor 420 updates the GUI shown on color image display 432 to GUI screen 606 shown in FIG. 6C. Alternatively, the user can select the "Review and Choose" option in FIG. 6B to choose particular images to be printed. In this case, processor 420 updates the GUI shown on color image display 432 to GUI screen 612 shown in FIG. 6D. Finally, the user can choose the "Remote Services" option in FIG. 6B to connect to the fulfillment center 40 via the ISP 1000. In this case, processor 420 updates the GUI shown on color image display 432 to GUI screen 800 shown in FIG. 6R.

FIG. 6C depicts a "Printing in Process" GUI screen 606. This screen lists the parameter settings that are being used to print the images. It also includes a progress bar 608 that graphically indicates the percentage of the pages that have so far been printed. Finally, the GUI screen 606 includes a "Cancel" option 610 that will abort the printing process when selected by the user.

FIG. 6D depicts a Layout startup screen 612. This allows the user to choose exactly how the pictures will be laid out on the printed pages. The user can use the up button 454 and down button 458 of cursor 450 to select option 614 or 616. The General Category option 614 represents a general category of print formats. If arrows 620 and 622 are visible, the user can use the cursor right arrow 456 or left arrow 452 in FIG. 3B to view other allowed print format settings. These print formats include general Photo Sizes (e.g. 8"×10" and 4"×6" size images) as well as specific formatted media identifiers (e.g. defined template numbers) that indicate specific paper size and layout details such as the location of perforations if the paper is perforated. The firmware memory 428 in printer 400 stores the paper size and layout information for each media identifier, to simplify the use of such media by the user. The specific options listed in option list 616 provide specific options that may be utilized for the General Category 614 chosen by the user, such as allowed photo sizes (e.g. 5"×7", 4"×6", etc.). Underneath the specific option list 616 is a graphical representation 618 of the currently selected layout and the current paper size and type settings 619. For example, graphical representation 618 indicates that two 5"×7" images will be printed on an 8.5"×11" size paper.

After the user chooses his/her preferred layout using GUI screen 612 in FIG. 6D and presses the Select button 442, processor 420 updates the GUI shown on color image display 432 to GUI screen 624 shown in FIG. 6E. The top of the screen 624 provides pertinent information including picture number 630 and copies 632 which is overlayed on a thumbnail image depicting the specific picture 636. The left arrow 638 and right arrow 640 located at the edges of the screen indicate to the user that they can view other images by depressing the left arrow 452 or the right arrow 456 of the cursor 450 in FIG. 3B in order to scroll to other digital images stored on removable memory 330. Checkmark 634 indicates whether or not image 636 has been selected for printing. By depressing Select button 442, the user can toggle between printing or not printing the specific image 636. Arrows 628 indicate to the user that they can change the numbers of prints for the specific image 636 by depressing the up arrow 454 and down arrow 458 of cursor 450 in FIG. 3B. If image 636 has been edited by the user (as will be described later in relation to FIGS. 6J–N), icon 626 is made visible in GUI screen 624. When the user presses View/Return button 444, processor 420 updates the GUI shown on color image display 432 to GUI screen 642 shown in FIG. 6F.

Figure 6F:
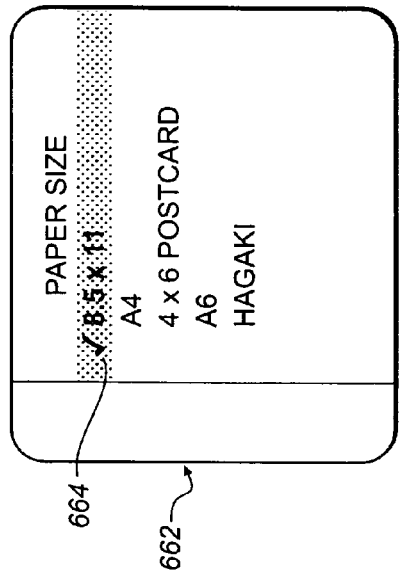

FIG. 6F depicts a Page Preview GUI screen 642, to allow the user to view the appearance of the entire print. A single page 648 is represented on GUI screen 642, and may contain multiple images, such as the four different images shown in page 648. The left arrows 644 and right arrow 646 indicate to the user that they can view other pages by depressing the left arrow 452 or the right arrow 456 of the cursor 450 in FIG. 3B. The paper size and type 652 and the current and total number of different pages to be printed 650 are also displayed in GUI screen 642.

Figure 6G:
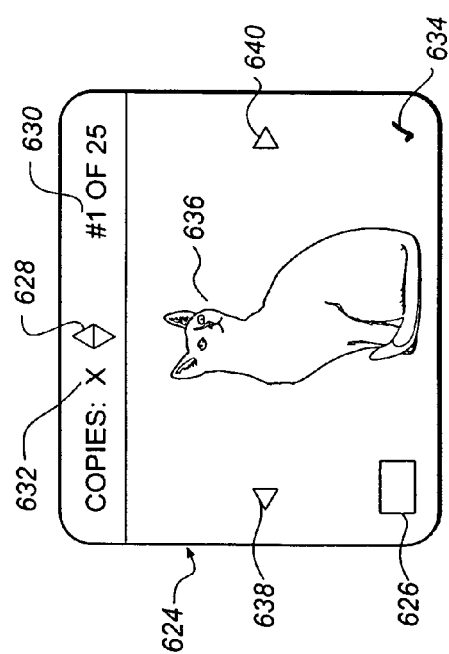

When the user presses the menu button 440 in FIG. 3B, processor 420 updates the GUI shown on color image display 432 to GUI screen 654 shown in FIG. 6G. Icons 656, 658, and 660 depict general menu categories. For example, icon 656 represents the Print Setup category mode 512 in FIG. 5, icon 658 represents the Paper Settings category mode 514 in FIG. 5, and icon 660 represents the Edits category mode 516 in FIG. 5. Once a general menu category has been selected (e.g. Print Setup category mode 512 in FIG. 5) the user can select specific submenu options relevant to that category (e.g. Photos or Layout). FIG. 5 lists the main menu categories and the submenu options. Arrow key 659 indicates to the user that they can select a different general menu category (e.g. Utilities Category mode 518 and Remote Services mode 520) by depressing the down arrow 458 of the cursor 450 in FIG. 3B.

Figure 6H:
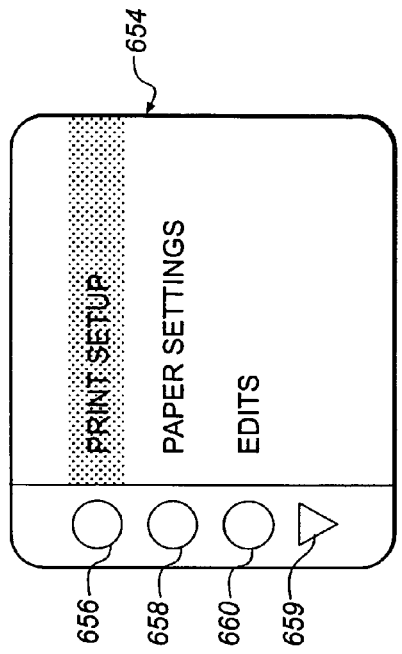

When the user selects the Paper Size submenu, processor 420 updates the GUI shown on color image display 432 to GUI screen 662 shown in FIG. 6H. A check mark 664 indicates the current paper size setting. The user can select a different paper size by using the up arrow 454 and down arrow 458 in FIG. 3B to highlight a different paper size. By then pressing the select button 442, the user can select the newly highlighted paper size to change paper size settings. The processor 420 then stores the newly selected paper size setting in firmware memory 428 of digital printer 400, and updates the GUI shown on color image display 432 to the Paper Settings Submenu (not shown). If the user instead presses the View/Return button 444, the user can exit the Paper Size submenu, and processor 420 will not modify the current setting stored in firmware memory 428.

Figure 6J:
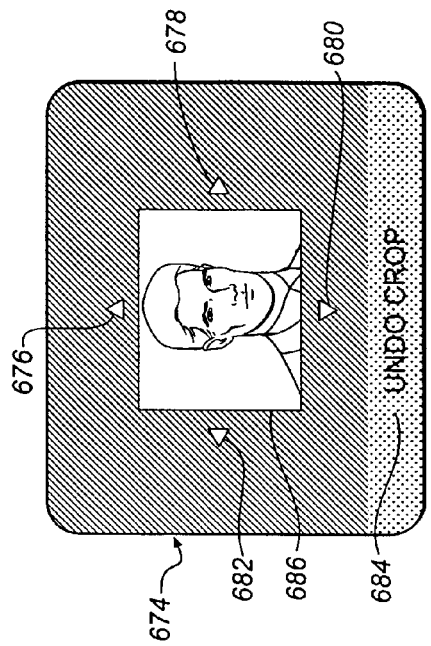
Figure 6L:
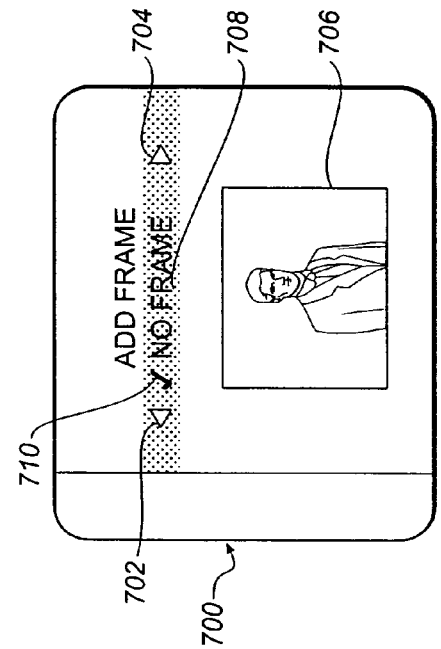
Figure 6I:
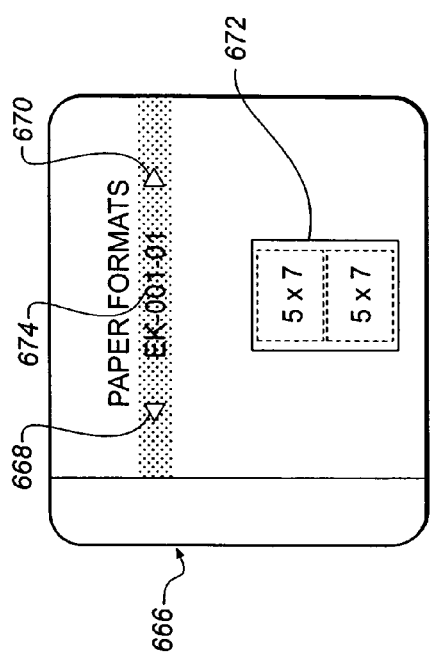

When the user selects the Paper Format submenu, processor 420 updates the GUI shown on color image display 432 to GUI screen 666 shown in FIG. 6I. GUI screen 666 indicates the currently selected media identifier 674. The left arrow 668 and right arrow 670 indicate to the user that they can view other media options by depressing the left arrow 452 or the right arrow 456 of the cursor 450 in FIG. 3B. The GUI screen 666 also includes graphical representation 672 of the currently selected media. This allows the user to easily visualize important aspects of the currently selected media. For example, if the currently selected media provides two perforated 5"×7" prints on a single 8.5"×11" size sheet of paper, the user can recognize this by viewing graphical representation 672 corresponding to the selected media identifier 674.

When the user selects the Crop submenu, processor 420 updates the GUI shown on color image display 432 to GUI screen 674 shown in FIG. 6J. A thumbnail view of a cropped portion of the current image read from memory card 330 is displayed within crop window 686. The image area outside crop window 686 has a darkened appearance, indicating that this area of the image will not be printed. Arrows 676, 678, 680, and 682 indicate to the user that they can modify the position of the crop window by using cursor 450 to change the area of the image that will be printed. If an image has been previously cropped, the cropping can be undone using the Undo Crop option 684. If the image has not been previously cropped, the Undo Crop option 684 is not displayed in GUI screen 674. When the user presses the select button 442, the processor 420 stores the crop settings for the current image in firmware memory 428. These stored settings will be used when the image is printed.

Figure 6K:
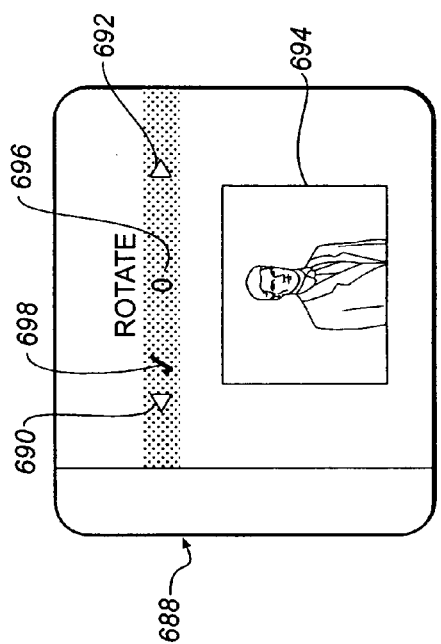

When the user selects the Rotate submenu, processor 420 updates the GUI shown on color image display 432 to GUI screen 688 shown in FIG. 6K. A thumbnail view of the current image read from memory card 330 is displayed in window 694. The left arrow 690 and right arrow 692 indicate to the user that they can selectively rotate the image by 90 degree increments by depressing the left arrow 452 or the right arrow 456 of the cursor 450 in FIG. 3B. The currently selected rotation setting 696 is indicated by a checkmark 698. When the user selects a different setting, the orientation of the image within window 694 is also rotated, so that the user can immediately preview the results of applying the rotation setting. By using the thumbnail image data stored within the image file on removable memory 330, processor 420 within printer 400 can quickly modify the thumbnail image and provide an immediate visual response in window 694 to the user's selection, so that the user can quickly confirm that they have made an appropriate selection. When the user presses select button 442, processor 420 stores the orientation setting for the current image in firmware memory 428. This stored setting will be used when the image is printed.

When the user selects the Add Frame submenu, processor 420 updates the GUI shown on color image display 432 to GUI screen 700 shown in FIG. 6L. A thumbnail view of the current image read from memory card 330 is displayed in window 706. The left arrow 702 and right arrow 704 indicate to the user that they can select various decorative frames by depressing the left arrow 452 or the right arrow 456 of the cursor 450 in FIG. 3B. The currently selected frame setting 708 is indicated by a checkmark 710. For example, GUI screen 700 shows that no frame has been selected. When the user selects a different frame option, the image shown within window 706 is updated to depict the current image within the selected frame. For example, GUI screen 712 in FIG. 6L' indicates that a Circle frame has been selected. The frame options can be stored in firmware memory 428 or in memory card 330, or downloaded from memory card 330 to firmware memory 428 using the methods described in commonly-assigned U.S. Pat. No. 5,477,264, Dec. 19, 1995, "Electronic imaging system using a removable software-enhanced storage device" to Sarbadhikari et. al., the disclosure of which is hereby incorporated by reference. By using the thumbnail image data stored within the image file on removable memory 330 as well as a thumbnail image of the decorative frame, processor 420 within printer 400 can quickly combine the current image and currently selected frame to provide an immediate visual response in window 706 to the user's selection, so that the user can quickly confirm that they have made an appropriate selection. When the user presses the select button 442 in FIG. 3B, processor 420 stores the frame setting for the current image in firmware memory 328 in FIG. 2. This stored setting will be used when the image is printed.

Figure 6M:
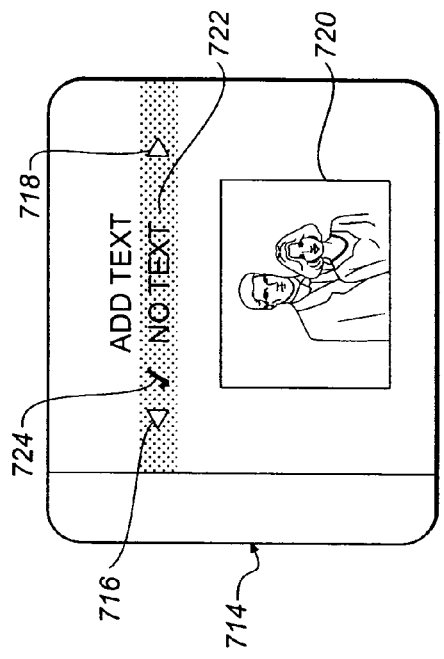

When the user selects the Add Text submenu, processor 420 updates the GUI shown on color image display 432 to GUI screen 714 shown in FIG. 6M. A thumbnail view of the current image read from memory card 330 is displayed in window 720. The left arrow 716 and right arrow 718 indicate to the user that they can select various text messages by depressing the left arrow 452 or the right arrow 456 of the cursor 450 in FIG. 3B. The currently selected text message setting 722 is indicated by a checkmark 724. For example, GUI screen 714 shows that no text has been selected. When the user selects a different text option, the image shown within window 720 is updated to depict the current image overlaid by the selected text. For example, GUI screen 726 in FIG. 6M' indicates that a text message "Anniversary" has been selected. Various text messages can be stored as text files within firmware memory 428 or on memory card 330 in FIG. 2. By using the thumbnail image data stored within the image file on memory card 330, processor 420 within printer 400 can quickly combine the current image and currently selected text message to provide an immediate visual response in window 720 to the user's selection, so that the user can quickly confirm that they have made an appropriate selection. When the user presses select button 442, processor 420 stores the text setting for the current image in firmware memory 428. This stored setting will be used when the image is printed.

Figure 6N:
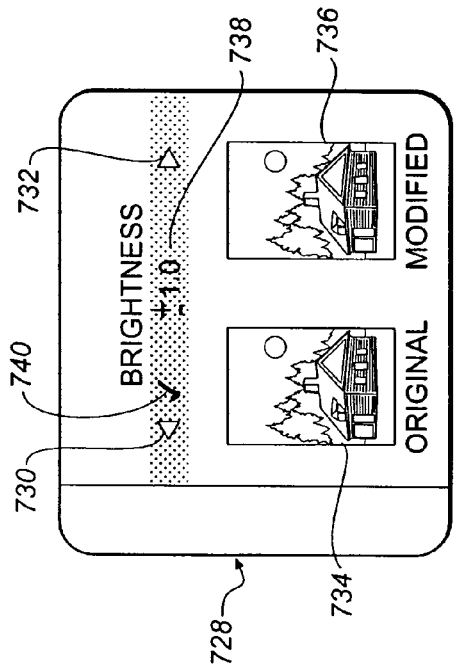
Figure 6L:
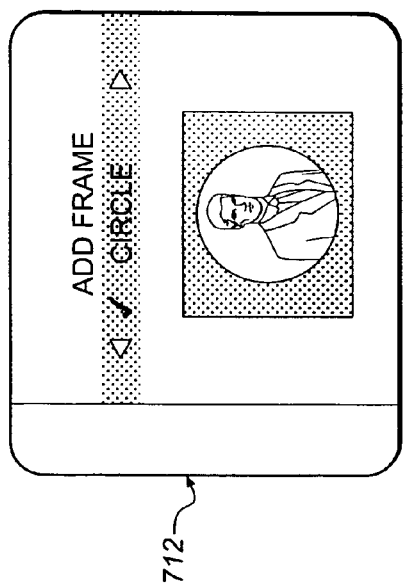
Figure 6M:
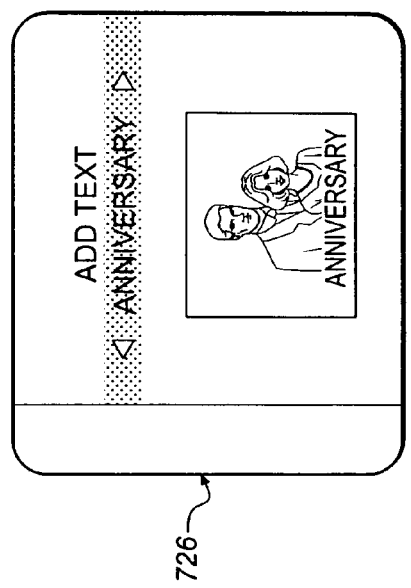

When the user selects the Change Brightness submenu, processor 420 updates the GUI shown on color image display 432 to GUI screen 728 shown in FIG. 6N. A small thumbnail view of the current image read from memory card 330 is displayed in window 734. A second window 736 depicts a brightness-adjusted version of the same digital image. The left arrow 730 and right arrow 732 indicate to the user that they can select brightness settings by depressing the left arrow 452 or the right arrow 456 of the cursor 450 in FIG. 3B. The currently selected brightness setting 738 is indicated by a checkmark 740. When the user selects various brightness settings, the image shown within window 736 is updated to depict the modified image, using the methods described in commonly-assigned U.S. patent application Ser. No. 09/315,647 filed May 20, 1999, "Correcting Exposure in a Rendered Digital Image", to Gilman, et. al. By using the thumbnail image data stored within the image file on memory card 330, processor 420 within printer 400 can quickly modify the image to provide an immediate visual response in window 736 to the user's selection, so that the user can quickly confirm that they have made an appropriate selection. When the user presses the select button 442, the processor 420 stores the brightness setting for the current image in firmware memory 428. This stored setting will be used when the image is printed.

When the user selects the Erase Card submenu, processor 420 updates the GUI shown on color image display 432 to GUI screen 742 shown in FIGS. 6–O. When the user confirms that they want to erase all of the images from memory card 330, a progress bar 744 indicates how much progress has been made in erasing the images. A cancel bar 746 can be selected to abort the process of erasing memory card 330.

When the user selects the Ink Level submenu, the processor 420 updates the GUI shown on color image display 432 to GUI screen 748 shown in FIG. 6P. GUI screen 748 includes a graphic representation 752 and numeric value 750 indicating the approximate level of ink remaining in the cartridge within marking apparatus 412 of digital printer 400. The user can return to the Utilities submenu (not shown) by pressing the Select button 442 or the View/Return button 444 in FIG. 3B.

When the user selects the User Default Layout submenu, processor 420 updates the GUI shown on color image display 432 to GUI screen 754 shown in FIG. 6Q. Using a process similar to that described in relation to FIG. 6D, the user can select a preferred layout. This layout is then used as the default the next time the printer is used, as described earlier in relation to FIG. 6A. When the user presses the select button 442, processor 420 stores the user default setting in firmware memory 428.

FIG. 6R depicts the Remote Services screen 800, which is displayed on color image LCD 432 when the user selects the Remote services option as described earlier in relation to FIG. 6B. GUI screen 800 allows the user to upload selected images for remote storage, download previously stored images, or upload selected images to produce photo products. In a preferred embodiment, screen 800 is only displayed when a connection to network service provider 1000 is available (e.g. when the modem 1001 detects via a dial tone that it is connected to a phone line). Otherwise a GUI screen (not shown) error message is displayed indicating to the user that no dial tone is detected.

When the user selects "Upload and store" in screen 800, processor 420 updates the GUI shown on color image display 432 to GUI screen 802 shown in FIG. 7A. Screen 802 allows the user to upload all of the images stored on memory card 330, or to select a subset of the images for uploading. Alternatively, if the printer 400 includes an internal (non-removable) printer memory that is used to store images (such as RAM memory 426, internal FLASH EPROM image memory, internal magnetic hard drive, etc.) these images could also be displayed and selected for uploading. If the user chooses to "select pictures" for uploading, the processor 420 updates the GUI shown on color image display 432 to GUI screen 804 shown in FIG. 7B. If the user selects "all pictures", the processor 420 updates the GUI shown on color image display 432 to GUI screen 818 shown in FIG. 7C.

FIG. 7B depicts GUI screen 804, which is somewhat similar to GUI screen 624 shown in FIG. 6E. The top of GUI screen 804 provides pertinent information including upload count 806 which is overlayed on a thumbnail image depicting the specific picture 808. The left arrow 810 and right arrow 812 located at the edges of the screen indicate to the user that they can view other images by depressing the left arrow 452 and right arrow 456 of the cursor 450 in FIG. 3B in order to scroll to other digital images stored on removable memory 330. Checkmark 814 indicates whether or not image 808 has been selected for uploading. By depressing Select button 442, the user can toggle between uploading or not uploading the specific image 808. When the user selects "done" icon 818, processor 420 updates the GUI shown on color image display 432 to GUI screen 818 shown in FIG. 7C.

FIG. 7C depicts GUI screen 820, which allows the user to select the album into which the images will be uploaded. These album names will be used to organize the user's images that will be uploaded and stored using image storage 45 in FIG. 4. The user can select "use existing album" to upload the images to a previously named album. The left arrow 824 and right arrow 822 located at the edges of the GUI screen 820 indicate to the user that they can select other album names by depressing the left arrow 452 or the right arrow 456 of the cursor 450 in FIG. 3B in order to scroll to find the names of other albums currently used to store images previously uploaded by the user to image storage 45. The user can alternately select to create a new album using the current date. In a preferred embodiment, this is used by default if the user does not make a different selection. Alternatively, the user can create a new album name. This can be done as described earlier relative to FIG. 6M. After selecting the album name, the user selects the "done" icon 826, or selects the "cancel" icon 828 to cancel the uploading operation.

When the user selects the "done" icon 826, processor 420 updates the GUI shown on color image display 432 to GUI screen 830 shown in FIG. 7D. The printer 400 uploads the user selected images from the memory card 330 to the fulfillment center 40 via the modem 1001 and the network service provider 1000. The images are stored in the image storage 45 by the fulfillment center 40. A progress bar 833 and an upload picture counter 832 keep the user appraised of the uploading operation. The user can pause the operation by selecting "pause" icon 834 if needed (e.g. to use the telephone) or cancel the operation by selecting "cancel" icon 836. After all the images have been uploaded, a GUI screen (not shown) can provide a message indicating to the user that the upload was successful.

Figure 8B:
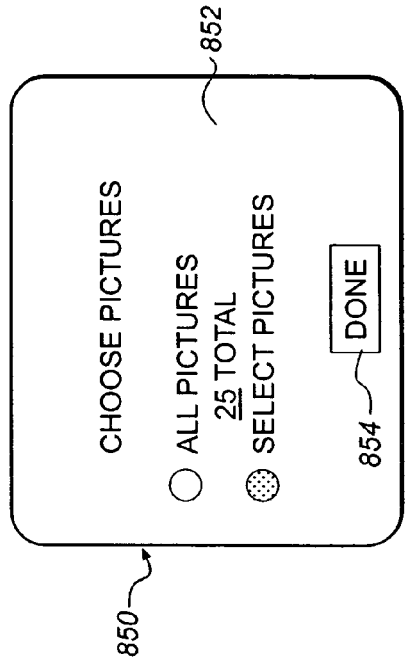
FIGS. 8A to 8D depict graphical user interface screens used to download previously uploaded images to the digital printer.
Figure 8D:
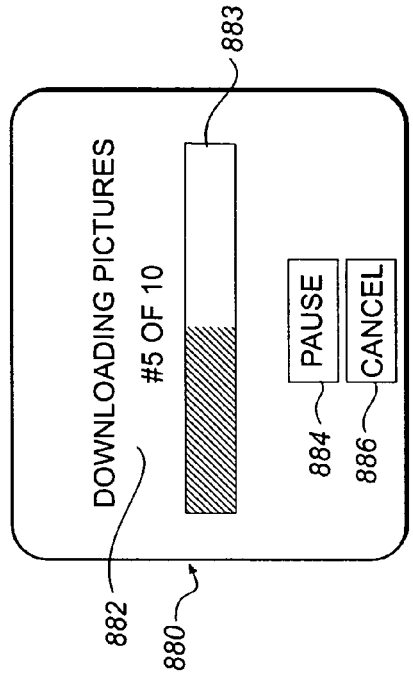
Figure 8A:
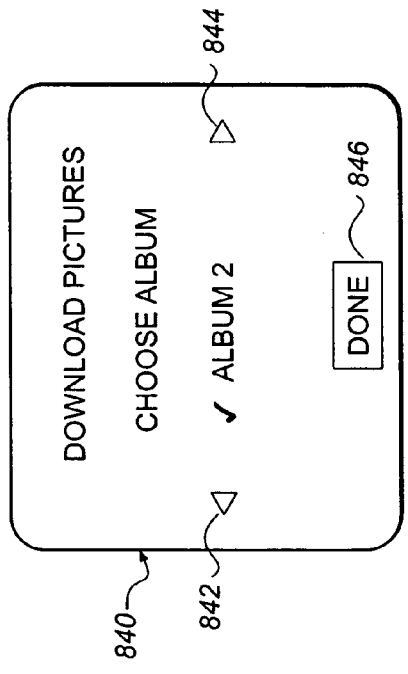

When the user selects "Download" in screen 800 (FIG. 6R), processor 420 updates the GUI shown on color image display 432 to GUI screen 840 shown in FIG. 8A. Screen 840 allows the user to select the Album name holding the images to be downloaded. The left arrow 842 and the right arrow 844 of the GUI screen 840 indicate to the user that they can select other album names by depressing the left arrow 452 and right arrow 456 of the cursor 450 in FIG. 3B in order to scroll to find the names of other albums currently used to store images previously uploaded by the user to image storage 45. When the user selects "done" icon 846, processor 420 updates the GUI shown on color image display 432 to GUI screen 850 shown in FIG. 8B.

FIG. 8B depicts GUI screen 850, which allows the user to either select "all pictures" in the album to download, or allows the user to select particular pictures for downloading by viewing thumbnail images of the pictures in the selected album which are transferred from image storage 45 to the digital printer 400 via network service provider 1000. A picture counter 852 indicates how many images are contained in the album, and in a preferred embodiment also provides a warning if the memory card 330 does not contain sufficient unused storage space to hold all of the images. When the user selects "done" icon 854, processor 420 updates the GUI shown on color image display 432 to GUI screen 860 shown in FIG. 8C.

Figure 8C:
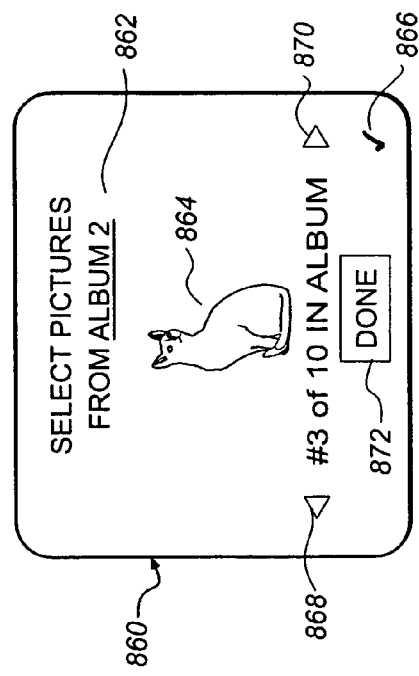

FIG. 8C depicts GUI screen 860, which allows the user to select particular images to be downloaded in a manner similar to that described in relation to GUI screen 804 shown in FIG. 7B. The top of GUI screen 860 provides pertinent information including the album name 862 which is overlayed on a thumbnail image depicting the specific picture 864 provided as a thumbnail size image file by fulfillment center 40 via channel 36. The left arrow 868 and right arrow 870 located at the edges of the screen indicate to the user that they can view other images by depressing the left arrow 452 or the right arrow 456 of the cursor 450 in FIG. 3B in order to view other thumbnail images from the same album downloaded from fulfillment center 40. Checkmark 866 indicates whether or not image 864 has been selected for downloading. By depressing Select button 442, the user can toggle between downloading or not downloading the specific image 864.

When the user selects "done" icon 872, processor 420 updates the GUI shown on color image display 432 to GUI screen 880 shown in FIG. 8D. The fulfillment center 40 downloads the user selected images via the network service provider 1000 and the modem 1001 within the digital printer 400. The processor 420 in the digital printer 400 stores the downloaded images on the memory card 330, so that they can later be printed locally. Alternatively, if the printer 400 includes an internal (non-removable) printer memory that is used to store images as described earlier, the downloaded images could be stored in the internal memory. As shown in FIG. 8D, a progress bar 883 and an upload picture counter 882 keep the user appraised of the downloading operation. The user can pause the operation by selecting "pause" icon 884 if needed (e.g. to use the telephone) or cancel the operation by selecting "cancel" icon 886. After all the images have been downloaded, a GUI screen (not shown) can provide a message indicating to the user that the download was successful.

Figure 9A:
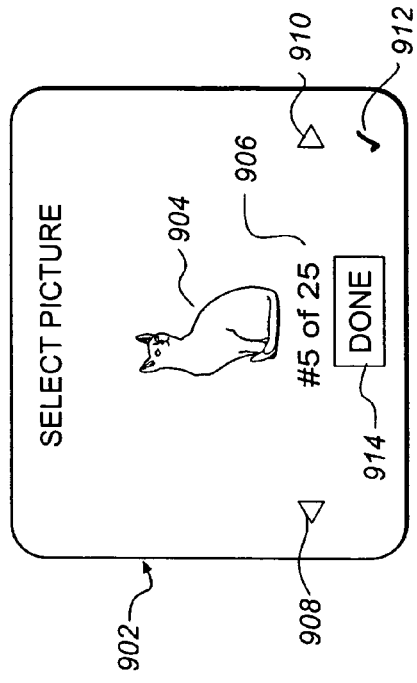
FIGS. 9A to 9D depict graphical user interface screens used to order photo products.

When the user selects "Photo products" in screen 800 (FIG. 6R), processor 420 updates the GUI shown on color image display 432 to GUI screen 900 shown in FIG. 9A. This allows the user to begin the process of selecting and ordering one or more photo products and/or photofinishing services. FIGS. 10A–10D depict various photo product options that can be selected by the user. The photo product options include selecting a particular print size from a plurality of print sizes 952 (FIG. 10A), including 8"×12", 12"×18", and 20"×30" size large prints. The photo product options also include selecting a picture frame 954 (FIG. 10B) from a variety of styles 956, including walnut, oak, and black color styles. The photo product options also include selecting a personalized picture mug 958 (FIG. 10C) from a variety of colors, including white, yellow, and blue mugs. Finally, the photo product options include selecting a particular type of photo album 962 (FIG. 10D) from a plurality of album types 964, such as bound albums, 3-ring binder albums, and 20-ring binder albums. Many other types of photo products, such as t-shirts, and many other options are of course possible. The user selects the type of photo product (e.g. enlargements, framed prints, mugs, or albums) using GUI screen 900 in FIG. 9A.

Figure 9B:
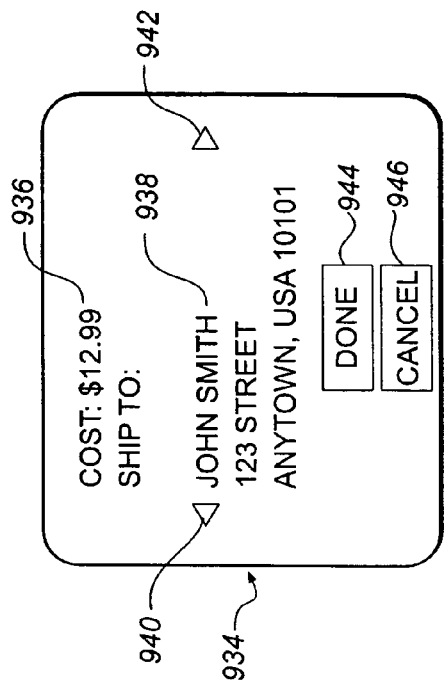

FIG. 9B depicts GUI screen 902, which allows the user to select a particular image to be uploaded to fulfillment service 400 and used for the photo product selected using GUI screen 900, in a manner similar to that described in relation to GUI screen 804 shown in FIG. 7B. GUI screen 902 provides a thumbnail image depicting the specific picture 904 that can be selected as well as the image number. The left arrow 908 and right arrow 910 located at the edges of the screen indicate to the user that they can view other images by depressing the left arrow 452 or the right arrow 456 of the cursor 450 in FIG. 3B in order to view other thumbnail images from the images stored on the memory card 330. Checkmark 912 indicates whether or not image 904 has been selected for uploading and use in producing the photo products and/or for photofinishing services. For certain types of photo products (e.g. albums) many images will be uploaded, while for others (e.g. mugs) only a single image might be uploaded for one order. By depressing Select button 442, the user can toggle between using or not using the specific image 904.

Figure 9C:
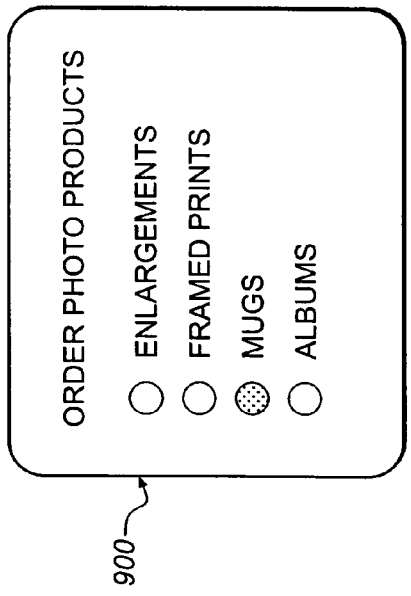
Figure 9D:
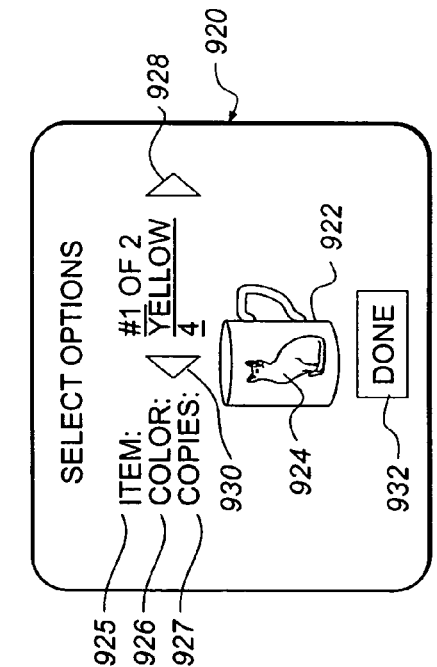
Figure 10B:
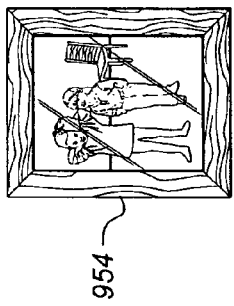
FIGS. 10A–10D depicts a plurality of photo products that may be ordered.
Figure 10D:
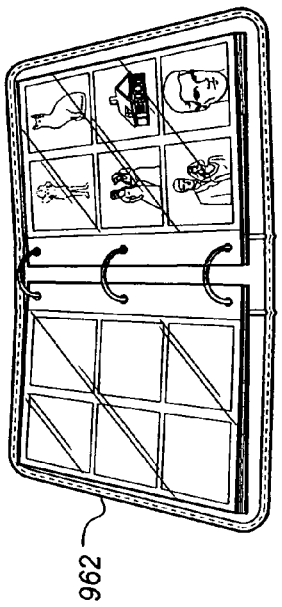
Figure 10A:
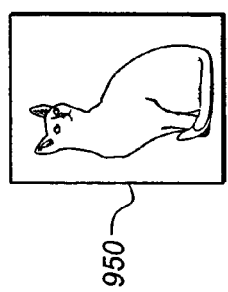
Figure 10C:
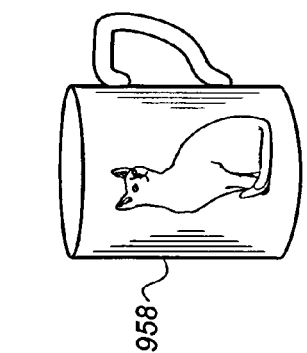

When the user selects the "done" icon 914, processor 420 updates the GUI shown on color image display 432 to GUI screen 920 shown in FIG. 9C. The printer 400 uploads a thumbnail of the selected image(s) to the fulfillment center 40 in FIG. 4. The network server 42 produces a small simulation of the photo product (e.g. a mug 922 including the user selected image 924) which is displayed in GUI screen 920. The user can select the photo product options from a list of options, such as color options 926 for each photo product item 925, and can also select the number of copies 927. The left arrow 928 and right arrow 930 indicate to the user that they can select other color options (e.g. white, blue), as well as the number of copies for each photo product, by depressing the left arrow 452 or the right arrow 456 of the cursor 450 in FIG. 3B. The simulated photo product is updated to reflect the user's selection. After selecting the product options (e.g. the options described in relation to FIGS. 10A–10D), the user selects the "done" icon 932, and processor 420 updates the GUI shown on color image display 432 to GUI screen 934 shown in FIG. 9D.

The printer 400 uploads the full resolution file of the selected image(s) to the fulfillment center 40 in FIG. 4. The network server 42 provides the cost of the photo product 936 and the default shipping address 938. The left arrow 940 and right arrow 942 indicate to the user that they can select other shipping address options (e.g. family and friends) by depressing the left arrow 452 or the right arrow 456 of the cursor 450 in FIG. 3B. The various shipping addresses are normally those provided earlier, when the user first established the account, as described earlier in relation to FIG. 4. The user selects the "done" icon 944 to finalize the order, or the "cancel" icon 946 to cancel the order.

The firmware code stored in firmware memory 428 of digital printer 400 can be customized to suit the needs of a particular user, as described in commonly-assigned U.S. patent application Ser. No. 09/534,469, entitled "Configuring and Purchasing Imaging Devices" to Parulski. Either the memory card 430 or the camera interface 422 can be used to upload the customized firmware to the firmware memory 428 from a separate computer (not shown). The configured firmware stored in firmware memory 428 can include personal digital data, for example, the names and addresses of family and friends to whom the user might be inclined to send photo products.

Although the invention has been primarily described with reference to an electronic or digital camera, the present invention is not limited thereto. It is noted that an image capture mechanism such as a traditional film camera or a hybrid camera can be used within the context of the invention. In the case of capturing images on film, the image would be converted to a digital signal by, for example, scanning the image. The digital signal can then be downloaded to the printer, via, for example, a computer and/or communication channel 36 (such as the Internet).

As a further alternative, film images from a traditional camera could be scanned by a service provider and written onto a recordable compact disk e.g. picture CD. The memory card interface 424 in FIG. 2 could instead be a CD reader that would read images from the recordable compact disk, and allow the user to select and print particular images.

The invention has been described in detail with particular reference to certain preferred embodiments thereof, but it will be understood that variations and modifications can be effected within the spirit and scope of the invention.

What is claimed is:

1. A digital printer for producing hardcopy prints, the printer comprising:
   a) a marking apparatus adapted to provide images on a print;
   b) a digital medium interface for transferring images from a digital storage medium which stores a plurality of digital images;
   c) a network connection for communicating with a network; and
   d) a graphical user interface having user controls, said graphical user interface being adapted to select a digital image stored on the digital storage medium and selectively communicate with both the marking apparatus for local printing of the selected image and the network for remote printing of the selected image at a remote printing site, wherein communication with the network for remote printing at the remote printing site further enables the graphical user interface to display a plurality of photo-product options that can be fulfilled at the remote printing site to create a fulfilled photo product, wherein the photo-product options include at least a physical object other than a paper print and the fulfilled photo product comprises the selected image incorporated with a selected photo-product option.

2. A printer according to claim 1, further comprising a color image display for viewing the transferred images.

3. A printer according to claim 1, wherein said marking apparatus is a color marking apparatus adapted to print the selected image to be printed on a hardcopy print.

4. A printer according to claim 3, further comprising a processor which receives the transferred images from the digital medium interface, said processor being adapted to control the color marking apparatus, the digital medium interface and the graphical user interface.

5. A printer according to claim 1, wherein said digital medium interface is a removable memory card interface.

6. A printer according to claim 1, wherein said digital medium interface is a compact disk reader.

7. A printer according to claim 4, further comprising a camera interface adapted to transfer captured images from an electronic camera to the processor.

8. A printer according to claim 1, wherein the user controls comprise menu buttons for selecting images to be uploaded to the network.

9. A printer according to claim 1, wherein the user controls enable a selection of a preferred photo product from a plurality of photo products.

10. A printer according to claim 9, further comprising a color image display, wherein the plurality of photo product options are displayed on the color image display.

11. A printer according to claim 1, wherein the network connection is adapted to download images from the network for storage prior to local printing, the downloaded images being recalled for use during printing.

12. A printer according to claim 2, wherein the user controls enable the selected image to be cropped prior to printing.

13. A printer according to claim 12, wherein the cropped image is displayed on the color image display prior to printing.

14. A printer according to claim 13, wherein the images stored on the digital storage medium include thumbnail images, and the display of the cropped image display is provided by cropping the thumbnail image.

15. A printer according to claim 2, wherein the user controls enable the selected image to be rotated prior to printing.

16. A printer according to claim 15, wherein the rotated image is displayed on the color image display prior to printing.

17. A printer according to claim 16, wherein the images stored on the digital storage medium include thumbnail images, and the rotated image display is provided by rotating the thumbnail image.

18. A printer according to claim 16, wherein a rotation setting selected for a particular image is stored in a digital memory in the printer prior to printing, and recalled for use during printing.

19. A printer according to claim 1, wherein the user controls enable the specific image to be overlayed with a text message prior to printing.

20. A printer according to claim 19, wherein the overlayed image is displayed on the color image display of the printer prior to printing.

21. A printer according to claim 19, wherein the text message selected for a particular image is stored in a digital memory in the printer prior to printing, and recalled for use during printing.

22. A printer according to claim 1, wherein the user controls enable a brightness of the specific image to be modified.

23. A printer according to claim 22, wherein the brightness modified image is displayed on a color image display of the printer prior to printing.

24. A printer according to claim 23, wherein a brightness setting selected for a particular image is stored in a digital memory in the printer prior to printing, and recalled for use during printing.

25. A printer according to claim 1, wherein the color marking apparatus includes a removable ink jet head.

26. A printer according to claim 25, wherein the graphical user interface includes a graphical image depicting the amount of ink remaining in the ink jet head.

27. A printer according to claim 1, wherein said network provides a communication with a fulfillment center which is adapted to provide a fulfilled photo product that incorporates the selected image.

28. A printer according to claim 1, wherein said network provides a communication with a fulfillment center which is adapted to provide photofinishing services to said selected image.

29. An imaging apparatus adapted to produce hardcopy prints, the apparatus comprising:
- an interface arrangement adapted to transfer images stored on a digital storage media, the transferred images being viewable on a display screen of the imaging apparatus;
- a communication arrangement for transferring images to a network; and
- user controls adapted to select local or remote network printing of the images stored on the digital storage media, wherein the selection of the remote network for printing of the images enables a display on said display screen of a plurality of photo-product options that can be fulfilled at a remote site, wherein the photo-product options include at least a physical object, and the fulfilled photo-product comprises a selected image incorporated with a selected photo-product option.

30. An apparatus according to claim 29, wherein said user controls include a control button for selecting an image of said stored images to be printed on a remote hardcopy printer connected to a network, while viewing the stored images on the display screen of the printer.

31. A method of producing prints, the method comprising the steps of:
- a) electronically capturing images by way of an electronic camera;
- b) transferring the captured images to a printer;
- c) displaying the captured images on a display screen on the printer;
- d) selecting a specific image to be printed from the captured images;
- e) uploading the selected image to a network for remote printing; and
- f) displaying a plurality of photo-product options that can be fulfilled at a remote site on the display screen, wherein the photo-product options include at least a physical object, and the fulfilled photo product comprises a selected image incorporated with a selected photo-product option.

32. A method according to claim 31, wherein said step of transferring the captured images to the printer comprises storing the captured images on a digital storage medium, and inserting the digital storage medium into an interface on said printer.

33. A method of producing prints, the method comprising the steps of:
- a) capturing images by way of an image capture mechanism;
- b) converting the images to digital images;
- c) transferring the digital images to a printer;
- d) displaying the images on a display screen on the printer;
- e) selecting a specific image to be printed from the images;
- f) transferring the selected image via a network to a fulfillment service for remote printing; and
- g) displaying a plurality of photo-product options that can be fulfilled at the fulfillment service on the display screen, wherein the photo-product options include at least a physical object other than a paper print, and the fulfilled photo-product comprises a selected image incorporated with a selected photo-product option.

34. A self-contained digital printer for producing hardcopy prints from images captured using a digital camera, the printer comprising:
- a marking apparatus adapted to provide images on a print;
- a camera interface for connecting the digital printer to a digital camera to enable the printer to receive a plurality of digital images from the digital camera the printer comprising a color image display;
- a network interface for communicating with a network coupled to a remotely located printing system;
- a processor for communicating with the marking apparatus, the camera interface, and the network interface; and
- a user interface coupled to the processor for selecting one of the plurality of digital images from the digital camera and for selecting a first printing mode which prints the selected digital image using the marking apparatus and a second printing mode which prints the selected image using the remotely located printing system;
- wherein in the second printing mode, the color image display provides a menu of selectable photo-product options that can be fulfilled at the remotely located printing system, wherein the photo-product options include at least a physical object other than a paper print, and the fulfilled photo-product comprises a selected image incorporated with a selected photo-product option.

35. A printer according to claim 34, wherein the camera interface includes an electrical connector that directly mates with a corresponding connector on the digital camera.

36. A printer according to claim 34, wherein the camera interface uses the USB interface.

37. A printer according to claim 34, wherein the camera interface uses the IEEE 1394 interface.

38. A printer according to claim 34, wherein the color image display pivots from a closed protected position to a viewable position.

39. A printer according to claim 34, wherein the menu is displayed only when the network interface is connected to the remotely located printing system.

40. A printer according to claim 34, wherein in the second mode, the color image display is used to display a shipping address to be used by the remotely located printing system.

41. A printer according to claim 40, wherein the shipping address is provided from a user account which includes billing information.

42. A printer according to claim 40, wherein the shipping address is provided from a user account established when the printer was purchased or rented.

43. A printer according to claim 1, wherein said photo-product options comprise at least one of a picture frame, a bound album, a t-shirt and a mug.

44. A printer according to claim 1, wherein said user controls are adapted to enable a selection of at least one of a color, style and quantity for the photo-product.

45. A printer according to claim 1, wherein said display is adapted to display the selected image incorporated with the selected photo-product option.

* * * * *